US012054693B2

(12) United States Patent
Man et al.

(10) Patent No.: US 12,054,693 B2
(45) Date of Patent: *Aug. 6, 2024

(54) HIGH PERFORMANCE LOW VISCOELASTICITY FOAMING DETERGENT COMPOSITIONS EMPLOYING EXTENDED CHAIN ANIONIC SURFACTANTS

(71) Applicant: ECOLAB USA INC., Saint Paul, MN (US)

(72) Inventors: Victor Fuk-Pong Man, Saint Paul, MN (US); Yvonne Marie Killeen, Saint Paul, MN (US); Derrick Richard Anderson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,807

(22) Filed: Apr. 25, 2023

(65) Prior Publication Data

US 2023/0257681 A1 Aug. 17, 2023

Related U.S. Application Data

(63) Continuation of application No. 17/451,373, filed on Oct. 19, 2021, now Pat. No. 11,674,111, which is a (Continued)

(51) Int. Cl.

*C11D 1/12* (2006.01)
*B08B 3/04* (2006.01)

(Continued)

(52) U.S. Cl.

CPC ............ *C11D 3/3723* (2013.01); *C11D 1/002* (2013.01); *C11D 1/02* (2013.01); *C11D 1/29* (2013.01);

(Continued)

(58) Field of Classification Search

CPC .. C11D 1/12; C11D 1/29; C11D 1/665; C11D 1/75; C11D 1/83; C11D 3/3418;

(Continued)

(56) References Cited

U.S. PATENT DOCUMENTS 3,871,898 A 3/1975 Reinert et al.
4,492,646 A 1/1985 Welch (Continued)

FOREIGN PATENT DOCUMENTS

EP 0368146 A2 5/1990
EP 0573341 B1 12/1993

(Continued)

OTHER PUBLICATIONS

Barber, J.A.S. et al., "Fluorescent tracer technique for measuring the quantity of pesticide deposited to soil following spray applications", Crop Protection 22, pp. 15-21, Dec. 30, 2003.

(Continued)

*Primary Examiner* — Brian P Mruk

(74) *Attorney, Agent, or Firm* — McKee, Voorhees & Sease, PLC

(57) ABSTRACT

The invention meets the needs above by providing a surfactant system, mixture or blend that can be used as a part of a soaking composition. The surfactant system is capable of forming emulsions with, and thus removing, oily and greasy stains. In a preferred embodiment the surfactant compositions of the invention can remove non-trans fat and fatty acid stains. The invention involves foaming soaking compositions that have some or part of the anionic surfactant present in the same replaced with an extended chain anionic surfactant.

20 Claims, 12 Drawing Sheets

Related U.S. Application Data continuation of application No. 16/797,832, filed on Feb. 21, 2020, now Pat. No. 11,180,718, which is a continuation of application No. 15/987,330, filed on May 23, 2018, now Pat. No. 10,604,725, which is a continuation of application No. 15/203,072, filed on Jul. 6, 2016, now Pat. No. 10,000,726, which is a continuation of application No. 14/686,895, filed on Apr. 15, 2015, now Pat. No. 9,410,110, which is a continuation of application No. 14/317,131, filed on Jun. 27, 2014, now Pat. No. 9,034,813, which is a continuation-in-part of application No. 14/246,928, filed on Apr. 7, 2014, now Pat. No. 9,109,190, which is a continuation of application No. 13/895,696, filed on May 16, 2013, now abandoned, which is a continuation of application No. 13/535,508, filed on Jun. 28, 2012, now Pat. No. 8,454,709, which is a continuation of application No. 12/884,608, filed on Sep. 17, 2010, now Pat. No. 8,246,696.

(51) Int. Cl.

| | |
|---|---|
| ***C11D 1/00*** | (2006.01) |
| ***C11D 1/02*** | (2006.01) |
| ***C11D 1/29*** | (2006.01) |
| ***C11D 1/65*** | (2006.01) |
| ***C11D 1/75*** | (2006.01) |
| ***C11D 1/83*** | (2006.01) |
| ***C11D 1/835*** | (2006.01) |
| ***C11D 1/86*** | (2006.01) |
| ***C11D 3/34*** | (2006.01) |
| ***C11D 3/37*** | (2006.01) |

(52) U.S. Cl.
CPC .................. *C11D 1/65* (2013.01); *C11D 1/75* (2013.01); *C11D 1/83* (2013.01); *C11D 1/835* (2013.01); *C11D 1/86* (2013.01); *C11D 3/3418* (2013.01); *C11D 2111/14* (2024.01)

(58) Field of Classification Search
CPC . C11D 3/3723; C11D 3/3769; C11D 11/0017; B08B 3/04
See application file for complete search history.

(56) References Cited

U.S. PATENT DOCUMENTS

| | | | | |
|---|---|---|---|---|
| 5,082,584 | A | 1/1992 | Loth et al. | |
| 5,376,310 | A | 12/1994 | Cripe et al. | |
| 5,393,468 | A | 2/1995 | Erilli et al. | |
| 5,576,279 | A | 11/1996 | Pyles | |
| 5,597,507 | A | 1/1997 | Garrett et al. | |
| 5,688,930 | A | 11/1997 | Bertho et al. | |
| 5,707,948 | A | 1/1998 | Evers et al. | |
| 5,888,957 | A | 3/1999 | Durbut et al. | |
| 5,955,415 | A | 9/1999 | Gutierrez et al. | |
| 5,994,283 | A | 11/1999 | Durbut et al. | |
| 6,136,769 | A | 10/2000 | Asano et al. | |
| 6,156,712 | A | 12/2000 | Stringer et al. | |
| 6,228,829 | B1 | 5/2001 | Vinson et al. | |
| 6,274,874 | B1 | 8/2001 | Sidhu | |
| 6,277,808 | B1 | 8/2001 | Tcheou et al. | |
| 6,472,364 | B1 | 10/2002 | Heltovics | |
| 6,511,954 | B1 | 1/2003 | Wilbur et al. | |
| 6,589,926 | B1 | 7/2003 | Vinson et al. | |
| 6,613,726 | B1 | 9/2003 | Gagliardi et al. | |
| 6,740,627 | B1 | 5/2004 | Clarke et al. | |
| 6,827,795 | B1 | 12/2004 | Kasturi et al. | |
| 7,037,884 | B2 | 5/2006 | Man | |
| 7,467,633 | B2 | 12/2008 | Smith et al. | |
| 8,246,696 | B2 | 8/2012 | Man et al. | |
| 8,454,709 | B2 | 6/2013 | Man et al. | |
| 8,580,727 | B2 | 11/2013 | Man et al. | |
| 8,759,276 | B2 | 6/2014 | Man et al. | |
| 8,785,363 | B2 | 7/2014 | Man et al. | |
| 9,034,813 | B2 * | 5/2015 | Man | C11D 1/29 510/426 |
| 9,109,190 | B2 | 8/2015 | Man et al. | |
| 9,410,110 | B2 * | 8/2016 | Man | C11D 1/002 |
| 9,528,077 | B2 | 12/2016 | Man et al. | |
| 10,000,726 | B2 * | 6/2018 | Man | C11D 1/835 |
| 10,273,433 | B2 | 4/2019 | Man et al. | |
| 10,604,725 | B2 * | 3/2020 | Man | C11D 1/86 |
| 10,662,396 | B2 | 5/2020 | Man et al. | |
| 10,883,068 | B2 | 1/2021 | Man et al. | |
| 11,180,718 | B2 * | 11/2021 | Man | C11D 1/75 |
| 11,674,111 | B2 * | 6/2023 | Man | C11D 1/83 510/475 |
| 2001/0026942 | A1 | 10/2001 | Carpenter et al. | |
| 2002/0193268 | A1 | 12/2002 | Embleton et al. | |
| 2003/0139313 | A1 | 7/2003 | Turner et al. | |
| 2006/0165739 | A1 | 7/2006 | Komesvarakul et al. | |
| 2006/0211593 | A1 | 9/2006 | Smith et al. | |
| 2007/0143032 | A1 | 6/2007 | Wieringa et al. | |
| 2008/0207981 | A1 | 8/2008 | Hong et al. | |
| 2009/0183877 | A1 | 7/2009 | Quintero et al. | |
| 2009/0208051 | A1 | 8/2009 | Emo et al. | |
| 2009/0223635 | A1 | 9/2009 | Lawless | |
| 2009/0261270 | A1 | 10/2009 | Carling | |
| 2011/0028374 | A1 | 2/2011 | Fossum et al. | |
| 2011/0269661 | A1 | 11/2011 | Corona et al. | |
| 2012/0058166 | A1 | 3/2012 | Glenn et al. | |
| 2012/0066840 | A1 | 3/2012 | Man et al. | |
| 2012/0071384 | A1 | 3/2012 | Christensen et al. | |
| 2012/0122747 | A1 | 5/2012 | Nekmard et al. | |
| 2014/0148374 | A1 | 5/2014 | Man et al. | |

FOREIGN PATENT DOCUMENTS

| | | | |
|---|---|---|---|
| JP | 2001246339 | A | 9/2001 |
| JP | 2009210514 | A | 9/2009 |
| WO | 9732962 | A1 | 9/1997 |
| WO | 9927054 | A1 | 6/1999 |
| WO | 0020543 | A1 | 4/2000 |
| WO | 0068348 | A1 | 11/2000 |
| WO | 2007064525 | A1 | 6/2007 |
| WO | 2007101470 | A1 | 9/2007 |
| WO | 2010086821 | A2 | 8/2010 |

OTHER PUBLICATIONS

Bergervoet, P.W.M. et al., "Application of the forensic Luminol for blood in infection control", Journal of Hospital Infection, 68, pp. 329-333, Jan. 18, 2008.

Carling, Philip et al., "Improved Cleaning of Patient Rooms Using a new Targeting Method", Brief Report Clinical Infectious Diseases, 42:385-388. Feb. 1, 2006.

Charoensaeng, Ampira et al., "Solubilization and Adsolubilization of Polar and Nonpolar Organic Solutes by Linker Molecules and Extended Surfactants", J Surfact. Deterg., 12:209-217, Mar. 5, 2009.

Do, Linh D. et al., "Environmentally Friendly Vegetable Oil Microemulsions Using Extended Surfactants and Linkers", J Surfact. Deterg., 12:91-99, 2009.

Griffith, C. J. et al., "An evaluation of hospital cleaning regimes and standards", Journal of Hospital Infection, 45:19-28, 2000.

Hartel, Peter G. et al., "Exposing water samples to ultraviolet light improves fluorometry for detecting human fecal contamination", Water Research 41, 3629-3642, 2007.

Lipscomb, I. P. et al., "Rapid method for the sensitive detection of protein contamination on surgical instruments", Journal of Hospital Infection, 62, 141-148, 2006.

Lu, Y. F. et al., "Laser surface cleaning and real-time monitoring", Proceedings of SPIE, vol. 4070, 331-337, 2000.

Mori, F. et al., "Equilibrium and dynamic behavior of a system containing a mixture of anionic and nonionic surfactants" Progress in Colloid & Polymer Science, 82:114-121, 1990.

(56) References Cited

OTHER PUBLICATIONS

Phan, Tri T. et al., "Microemulsion-Based Vegetable Oil Detergency Using an Extended Surfactant", J. Surfact. Deterg., 13:313-319, Mar. 2010.
Pyrek, Kelly, Virgo Publishing, "Hospitals Can Learn from CSI Sleuthing Methods", www.infectioncontroltoday.com, 1 page, posted Jun. 9, 2008.
Salo, Satu et al., "Cleaning validation of fermentation tanks" Food and Bioproducts Processing 86, 204-210, 2008.
NHS Supply Chain, Product MRB180, Catalog page, https://my.supplychain.nhs.uk/catalogue/product/mrb180/cleanser-alcohol-hand-rub-training-gel-fluorescent-gel-500ml-bottle-with-integral-pump-dispenser (retrieved from Internet on Mar. 25, 2011.
Wisniewski, Karen, "Specialty Liquid Household Surface Cleaners" Colgate-Palmolive Company, pp. 463-512 Dec. 30, 2011.
Witthayapanyanon, Anuradee et al., "Interfacial Properties of Extended-Surfactant-Based Microemulsions and Related Macroemulsions" J. Surfact. Deterg., 13:127-134, 2010.
Zhang, Hui et al., "Lauryl Alcohol and Amine Oxide as Foam Stabilizers in the Presence of Hardness and Oily Soil" Journal of Surfactants and Detergents, vol. 8, No. 1, pp. 99-107, 2005.
Ecolab USA Inc., PCT/US2010/049319, filed Sep. 17, 2010, "International Search Report", 3 pages, mailed Jun. 1, 2011.
Ecolab USA Inc., PCT/US2010/049326, filed Sep. 17, 2010, "International Search Report", 4 pages, mailed Jun. 1, 2011.
Ecolab USA Inc., PCT/US2010/049334, filed Sep. 17, 2010, "International Search Report", 3 pages, mailed Jun. 21, 2011.
Ecolab USA Inc., PCT/US2010/049338, filed Sep. 17, 2010, "International Search Report", 3 pages, mailed Jun. 28, 2011.
International Searching Authority, "Search Report and Written Opinion", issued in connection with International Patent Application No. PCT/US2015/0383007, 12 pages, mailed Sep. 23, 2015.
JP1100442(A)—Hitachi Ltd.—English Abstract—published Apr. 18, 1989.
JP10292199(A)—Lion Corp.—English Abstract—published Nov. 4, 1989.
JP63073140(A)—Hitachi Ltd; Hitachi Device Eng.—English Abstract—published Apr. 2, 1988.

* cited by examiner

HIGH PERFORMANCE LOW VISCOELASTICITY FOAMING DETERGENT COMPOSITIONS EMPLOYING EXTENDED CHAIN ANIONIC SURFACTANTS

CROSS REFERENCE TO RELATED APPLICATIONS

This application is a Continuation of U.S. Ser. No. 17/451,373, filed Oct. 19, 2021, now U.S. Pat. No. 11,674,111, issued Jun. 13, 2023 which is a Continuation of U.S. Ser. No. 16/797,832, filed on Feb. 21, 2020, now U.S. Pat. No. 11,180,718, issued Nov. 23, 2021, which is a Continuation of U.S. Ser. No. 15/987,330, filed May 23, 2018, now U.S. Pat. No. 10,604,725, issued Mar. 31, 2020, which is a Continuation of U.S. Ser. No. 15/203,072, filed Jul. 6, 2016, now U.S. Pat. No. 10,000,726, issued Jun. 19, 2018, which is a Continuation of U.S. Ser. No. 14/686,895, filed Apr. 15, 2015, now U.S. Pat. No. 9,410,110, issued Aug. 9, 2016, which is a Continuation of U.S. Ser. No. 14/317,131, filed Jun. 27, 2014, now U.S. Pat. No. 9,034,813, issued May 19, 2015, which is a Continuation-in-Part of U.S. Ser. No. 14/246,928, filed Apr. 7, 2014, now U.S. Pat. No. 9,109,190, issued Aug. 18, 2015, which is a Continuation of U.S. Ser. No. 13/895,696, filed May 16, 2013 (abandoned), which is a Continuation of U.S. Ser. No. 13/535,508, filed Jun. 28, 2012, now U.S. Pat. No. 8,454,709, issued Jun. 4, 2013, which is a Continuation of U.S. Ser. No. 12/884,608, filed Sep. 17, 2010, now U.S. Pat. No. 8,246,696, issued on Aug. 21, 2012, all of which are hereby incorporated by reference in their entirety.

FIELD OF THE INVENTION

The invention relates to surfactant systems and foaming detergent compositions which employ new surfactants including extended chain anionic surfactants. The detergent compositions are useful for soaking compositions, particularly for dishware. The soaking composition can remove challenging stains including non-trans fats and fatty acids by forming emulsions with such oily and greasy soils for their removal.

BACKGROUND OF THE INVENTION

Heavily soiled wares can require multiple cleaning steps to remove the soils from the surfaces of the wares. Pots and pans used for prepping, cooking, and baking ware in full service restaurants can be particularly difficult to clean in a dishmachine due to the caramelized soil baked on to the surface of the ware. Some full service restaurants have attempted to overcome this issue by using, as a pre-step to washing the pots and pans in the dishmachine, a 3-compartment sink for soaking the pots and pans. Exemplary soaking solutions include water, pot and pan detergent solutions, or silverware presoaks. Components of these compositions typically include metal protectors, surfactants, alkalinity sources and the like.

Surfactants are the single most important cleaning ingredient in cleaning products. They surfactants reduce the surface tension of water by adsorbing at the liquid-gas interface. They also reduce the interfacial tension between oil and water by adsorbing at the liquid-liquid interface. When dissolved in water, surfactants give a product the ability to remove soil from surfaces. Each surfactant molecule has a hydrophilic head that is attracted to water molecules and a hydrophobic tail that repels water and simultaneously attaches itself to oil and grease in soil. These opposing forces loosen the soil and suspend it in the water.

Surfactants do the basic work of detergents and cleaning compositions by breaking up stains and keeping the soil in the water solution to prevent re-deposition of the soil onto the surface from which it has just been removed. Surfactants disperse soil that normally does not dissolve in water. Environmental regulations, consumer habits, and consumer practices have forced new developments in the surfactant industry to produce lower-cost, higher-performing, and environmentally friendly products.

Nonylphenol ethoxylates (NPEs) are predominantly used as industrial and domestic detergents as a surfactant. However, while effective, NPEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods.

An alternative to NPEs are alcohol ethoxylates (AEs). These alternatives are less toxic and degrade more quickly in the environment. However, it has recently been found that textiles washed with NPE free and phosphorous free detergents containing AEs smoke when exposed to high heat, e.g., in a steam tunnel in industrial laundry processes, or when ironed.

Surfactant is often incorporated into an oil-in-water microemulsion to make the products appear more homogenous. These cleaning products contain a variety of different surfactant systems in 5-20% solubilized oil which are then diluted with water prior to use. The surfactant systems generally employed in these cleaning products include a mixture of anionic or non-ionic surfactants and a short chain alcohol to help solubilize the oil phase and prevent liquid crystal formation. While short chain alcohols are effective, they also contribute to the volatile organic solvent content (VOC) of the product and pose As can be seen there is a continuing need to develop effective, environmentally friendly, and safe surfactants and surfactant systems that can be used in cleaners of all kinds, particularly soaking compositions.

SUMMARY OF THE INVENTION

The invention meets the needs above by providing a surfactant system, mixture or blend that can be used as a part of a foaming detergent soaking composition with increased stability and stable viscosity over different salt concentrations thereby increasing detergency. The surfactant system is capable of forming emulsions with, and thus removing, oily and greasy stains. In a preferred embodiment the surfactant compositions of the invention can remove non-transfat and fatty acid stains. Generally, non-transfats are more difficult to remove than transfats both from a cleaning and removal standpoint as well as laundry safety concern due to heat of polymerization of the non-trans fats. The invention is highly effective for removal of transfats, and other oily soils.

The invention contemplates the use of an extended chain anionic surfactant or to partially or wholly replace traditional anionic surfactants present in foaming detergent compositions. The use of extended chain anionic surfactants results in formulations having lowered viscosity thus allowing for easier manufacturing and dispensing. The lowered viscosity also allows for the development of super-concentrate detergent formulations. With the use of the extended chain anionic surfactants, the salt curve is significantly flattened thus the viscosity remains stable throughout different salt concentrations.

According to the invention, foaming cleaning compositions are formed with an detersive amount of an extended chain anionic surfactant which can be used alone or in combination with other traditional anionic surfactants (the total anionic surfactant package constitutes from about 1 wt. % to about 75 wt. %) and from about 0.01 wt. % to about 5.0 wt. % of ethoxylated PEI or other similarly positive charged polymer such as polyamines, polyquats, polyclycerol quats, and products commercially available from Nalco such as VX10035 a propoxylated PEI and two other Nalco products, VX9945 and VX9946, in which the PEI is first propoxylated then exthoxylated.

The positively charged class of polymers such as polyethyleneimine (PEI) and its derivatives such as ethoxylated (PEI) polymers, propoxylated (PEI) polymers, polyamines, polyquats, polyglycerol quats, and other PEI derivatives, their salts or mixtures thereof are used in foaming compositions to provide the electrostatic interaction with surfactants present in the foaming compositions, particularly preferred are ethoxylated or propoxylated PEI polymers. In preferred such embodiments, the PEI or PEIs are branched, spherical polymeric amines, and the molecular weight of the PEI or PEI salt used is from about 800 daltons to about 2 million Daltons. In addition, in preferred such embodiments, the charge density of the PEI or PEI salt used is from about 15 meq/g to about 25 meq/g, more preferably from about 16 meq/g to about 20 meq/g. Examples of such preferred PEIs include the BASF products LUPASOL WF (25 kDa; 16-20 meq/g) and Lupasol® FG (800 daltons; 16-20 meq/g), and the SOKALAN® family of polymers available from BASF, e.g., SOKALAN® HP20, SOKALAN® HP22 G, and the like.

The composition also includes water and additional optional detersive ingredients. The cleaning compositions are substantially free of cocamide DEA. Other surfactants and standard cleaning composition components may also be included as well.

In one embodiment, the present invention is a foaming detergent composition which can be used as a soaking composition.

In yet another embodiment, the present invention is a method of removing heavily soiled surfaces from a substrate. The method includes forming a composition having an anionic extended chain surfactant and a positively charged polymer and contacting the surface of the substrate with the composition.

In another embodiment, the detergent soaking composition is used by mixing water with the composition to form a use solution. The substrate is contacted with the use solution.

The surfactant system comprises a synergistic combination of components with an extended chain anionic surfactant. The extended anionic surfactant is preferably one with at least 5 moles of propoxylation. Most preferred is from about 5 to about 8 moles of propoxylation. Further in a preferred embodiment the extended chain anionic surfactant replaces some or all of traditional anionic surfactants such as SLES.

These and other objects, features and attendant advantages of the present invention will become apparent to those skilled in the art from a reading of the following detailed description of the preferred embodiment and the appended claims.

DETAILED DESCRIPTION OF THE INVENTION

Figure 1:
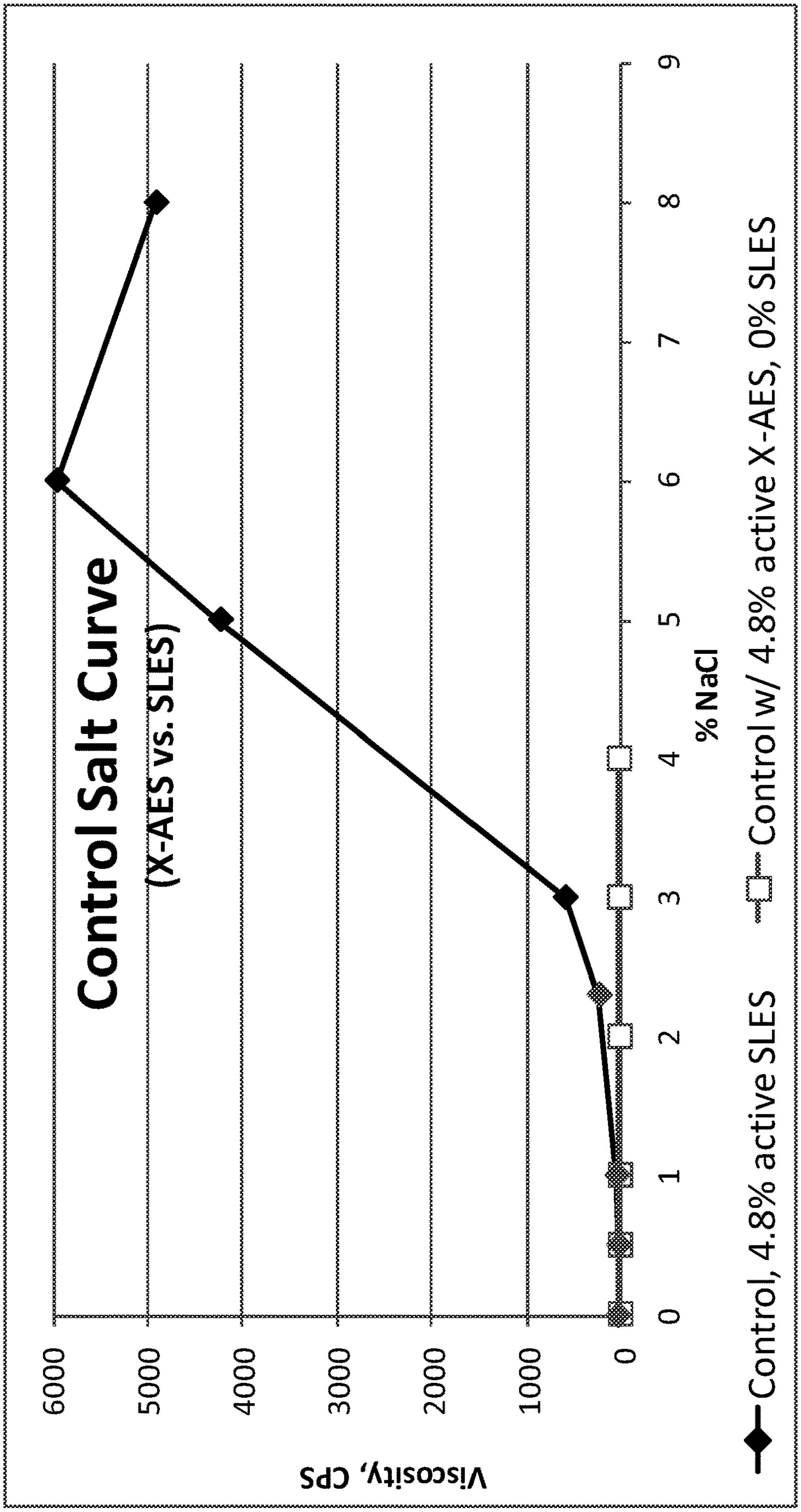
FIG. 1 is a graph showing the salt curve of a viscosity over percent NaCl with a traditional pot and pan soaking composition with SLES compared to the same composition with SLES replaced with the extended chain anionic surfactant X-AES.

So that the invention may be more readily understood, certain terms are first defined and certain test methods are described.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, "weight percent," "wt-%", "percent by weight", "% by weight", and variations thereof refer to the concentration of a substance as the weight of that substance divided by the total weight of the composition and multiplied by 100. It is understood that, as used here, "percent", "%", and the like are intended to be synonymous with "weight percent", "wt-%", etc.

The term "about," as used herein, modifying the quantity of an ingredient in the compositions of the invention or employed in the methods of the invention refers to variation in the numerical quantity that can occur, for example, through typical measuring and liquid handling procedures used for making concentrates or use solutions; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers subsumed within that range (e.g., 1 to 5 includes 1, 1.5, 2, 2.75, 3, 3.80, 4, and 5).

The term "surfactant" as used herein is a compound that contains a lipophilic segment and a hydrophilic segment, which when added to water or solvents, reduces the surface tension of the system.

An "extended chain surfactant" is a surfactant having an intermediate polarity linking chain, such as a block of poly-propylene oxide, or a block of poly-ethylene oxide, or a block of poly-butylene or a mixture thereof, inserted between the surfactant's conventional lipophilic segment and hydrophilic segment.

The term "electrolyte" refers to a substance that will provide ionic conductivity when dissolved in water or when in contact with it; such compounds may either be solid or liquid.

As used herein, the term "microemulsion" refers to thermodynamically stable, isotropic dispersions consisting of nanometer size domains of water and/or oil stabilized by an interfacial film of surface active agent characterized by ultra low interfacial tension.

It should be noted that, as used in this specification and the appended claims, the singular forms "a", "an", and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

The term "hard surface" refers to a solid, substantially non-flexible surface such as a counter top, tile, floor, wall, panel, window, plumbing fixture, kitchen and bathroom furniture, appliance, engine, circuit board, and dish.

The term "soft surface" refers to a softer, highly flexible material such as fabric, carpet, hair, and skin.

As used herein, the term "cleaning" refers to a method used to facilitate or aid in soil removal, bleaching, microbial population reduction, and any combination thereof.

"Soil" or "stain" refers to a non-polar oily substance which may or may not contain particulate matter such as mineral clays, sand, natural mineral matter, carbon black, graphite, kaolin, environmental dust, etc.

As used herein, the term "cleaning composition" includes, unless otherwise indicated, detergent compositions, laundry cleaning compositions, hard surface cleaning compositions, and personal care cleaning compositions for use in the health and beauty area. Cleaning compositions include granular, powder, liquid, gel, paste, bar form and/or flake type cleaning agents, laundry detergent cleaning agents, laundry soak or spray treatments, fabric treatment compositions, dish washing detergents and soaps, shampoos, body washes and soaps, and other similar cleaning compositions. As used herein, the term "fabric treatment composition" includes, unless otherwise indicated, fabric softening compositions, fabric enhancing compositions, fabric freshening compositions and combinations thereof. Such compositions may be, but need not be rinse added compositions.

As used herein the term "free" or "substantially free" refers to a composition, mixture, or ingredient to which the specified compound is not added such as cocamide DEA-free, phosphorous-free NTA-free" or even SLES-free". Should the compound be present through contamination of the composition, mixture, or ingredient, the level of the compound in the resulting composition is less than approximately 1 wt %, less than approximately 0.5 wt %, less than approximately 0.25 wt % and often less than approximately 0.1 wt %.

Soaking Compositions Employing Extended Chain Anionic Surfactants

According to the invention, soaking composition are employed in which extended chain anionic surfactants are used to increase cleaning of difficult soils such as non trans fat soils and greasy soils. The extended chain surfactants act to increase foam stability, and allow for the creation of super concentrated formulas. The extended chain anionic surfactants can is used in addition to traditional anionic surfactants or can replace some of all of the anionic surfactants in a particular soaking composition.

Extended Chain Anionic Surfactants

The surfactant system or mixture of the invention employs one or more extended chain surfactants. These are surfactants that have, for example, an intermediate polarity poly-propylene oxide chain (or linker) inserted between the lipophilic tail group and hydrophilic polar head, which may be anionic or nonionic.

Examples of lipophilic tails groups include hydrocarbons, alkyl ether, fluorocarbons or siloxanes. Examples of anionic and nonionic hydrophilic polar heads of the extended surfactant include, but are not necessarily limited to, groups such as polyoxyethylene sulfate, ethoxysulfate, carboxylate, ethoxy-carboxylate, C6 sugar, xylitol, di-xylitol, ethoxy-xylitol, carboxylate and xytol, carboxylate and glucose. Extended surfactants include a linker polypropylene glycol link.

The general formula for a nonionic extended surfactant is $R-[L]_x-[O—CH_2—CH_2]_y$, where R is the lipophilic moiety, a linear or branched, saturated or unsaturated, substituted or unsubstituted, aliphatic or aromatic hydrocarbon radical having from about 8 to 20 carbon atoms, L is a linking group, such as a block of poly-propylene oxide, a block of poly-ethylene oxide, a block of poly-butylene oxide or a mixture thereof; x is the chain length of the linking group ranging from 5-15; and y is the average degree of ethoxylation ranging from 1-5.

Anionic extended surfactants generally have the formula $$R-[L]_x-[O-CH_2-CH_2]_y-M$$

where M is any ionic species such as carboxylates, sulfonates, sulfates, and phosphates. A cationic species will generally also be present for charge neutrality such as hydrogen, an alkali metal, alkaline earth metal, ammonium and ammonium ions which may be substituted with one or more organic groups.

These extended chain surfactants attain low interfacial tension and/or high solubilization in a single phase microemulsion with oils, such as nontrans fats with additional beneficial properties including, but not necessarily limited to, insensitivity to temperature and irreversibility. For example, in one embodiment the emulsions may function over a relatively wide temperature range of from about 20 to about 280° C., alternatively from about 20 to about 180° C. (350° F.).

Many extended chain anionic and nonionic surfactants are commercially available from a number of sources. Table 1 is a representative, nonlimiting listing of several examples of the same.

TABLE 1

| Extended Surfactants | Source | % Active | Structure |
|---|---|---|---|
| Plurafac SL-42(nonionic) | BASF | 100 | $C_{6-10}$—$(PO)_3(EO)_6$ |
| Plurafac SL-62(nonionic) | BASF | 100 | $C_{6-10}$—$(PO)_3(EO)_8$ |
| Lutensol XL-40(nonionic) | BASF | 100 | $C_{10}$—$(PO)_a(EO)_b$ series, where a is 1.0 to 1.5, and b is 4 to 14. |
| Lutensol XL-50(nonionic) | BASF | 100 | |
| Lutensol XL-60(nonionic) | BASF | 100 | |
| Lutensol XL-70(nonionic) | BASF | 100 | |
| Lutensol XL-79(nonionic) | BASF | 85 | |
| Lutensol XL-80(nonionic) | BASF | 100 | |
| Lutensol XL-89(nonionic) | BASF | 80 | |
| Lutensol XL-90 (nonionic) | BASF | 100 | |
| Lutensol XL-99 (nonionic) | BASF | 80 | |
| Lutensol XL-100 (nonionic) | BASF | 100 | |
| Lutensol XL-140 (nonionic) | BASF | 100 | |
| Ecosurf EH-3 (nonionic) | Dow | 100 | 2-Ethyl Hexyl $(PO)_m(EO)_n$ series |
| Ecosurf EH-6 (nonionic) | Dow | 100 | |
| Ecosurf EH-9(nonionic) | Dow | 100 | |
| Ecosurf SA-4(nonionic) | Dow | 100 | $C_{6-12}$ $(PO)_{3-4}$ $(EO)_4$ |
| Ecosurf SA-7 (nonionic) | Dow | 100 | $C_{6-12}$ $(PO)_{3-4}$ $(EO)_7$ |
| Ecosurf SA-9 (nonionic) | Dow | 100 | $C_{6-12}$ $(PO)_{3-4}$ $(EO)_9$ |
| Surfonic PEA-25(nonionic) | Huntsman | 100 | $C_{12-14}(PO)_2N[(EO)_{2.5}\}_2$ |
| X-AES (anionic) | Huntsman | 23 | $C_{12-14}$—$(PO)_{16}$—$(EO)_2$-sulfate |
| X-LAE (nonionic) | Huntsman | 100 | $C_{12-14}$—$(PO)_{16}(EO)_{12}$ |
| Alfoterra 123-4S (anionic) | Sasol | 30 | $C_{12-13}$—$(PO)_4$-sulfate |
| Alfoterra 123-8S (anionic) | Sasol | 30 | $C_{12-13}$—$(PO)_8$-sulfate |
| Marlowet 4561 (nonionic under acidic condition, anionic under alkaline condition) | Sasol | 90 | $C_{16-18}(PO)_4(EO)_5$-carboxylic acid |
| Marlowet 4560 (nonionic under acidic condition, anionic under alkaline condition) | Sasol | 90 | $C_{16-18}(PO)_4(EO)_2$-carboxylic acid |
| Marlowet 4539 (nonionic under acidic condition, anionic under alkaline condition) | Sasol | 90 | Iso $C_9$—$(PO)_2EO_2$-carboxylic acid |

In a preferred embodiment the extended chain surfactant is an anionic extended chain surfactant with at least 5 moles of propoxylation. Most preferred is from about 5 to about 8 moles of propoxylation.

Anionic Surfactants

The invention contemplates a traditional soaking composition which employ the use of one or more traditional anionic surfactants which may be in addition to, or replaced in part or completely by the extended chain surfactants described supra. Anionic surfactants are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

As those skilled in the art understand, anionics are excellent detersive surfactants and are therefore traditionally favored additions to heavy duty detergent compositions. Generally, anionics have high foam profiles which are useful for the present foaming cleaning compositions. Anionic surface active compounds are useful to impart special chemical or physical properties other than detergency within the composition.

The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989).

The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. A particularly preferred anionic surfactant is alpha olefin sulfonate. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like. The fifth class includes sulfuric acid esters (and salts), such as alkyl ether sulfates, alkyl sulfates, and the like. A particularly preferred anionic surfactant is sodium laurel ether sulfate.

Anionic sulfate surfactants suitable for use in the present compositions include the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl)glucamine sulfates, and sulfates of alkylpolysaccharides such as the sulfates of alkylpolyglucoside (the nonionic nonsulfated compounds being described herein). Ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Examples of suitable synthetic, water soluble anionic detergent compounds include the ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants suitable for use in the present compositions include the alkyl ethoxy carboxylates, the alkyl polyethoxy polycarboxylate surfactants and the soaps (e.g. alkyl carboxyls). Secondary soap surfactants (e.g. alkyl carboxyl surfactants) useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic detergents suitable for use in the present compositions include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy)sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

The particular salts will be suitably selected depending upon the particular formulation and the needs therein.

Further examples of suitable anionic surfactants are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23.

In a preferred embodiment the anionic surfactant that is replaced is sodium laurel ethoxy sulfate.

Anionic surfactants are present in the composition in any detersive amount which can range typically from about 1 wt. % to about 75 wt. % of the cleaning composition. In a preferred embodiment, about 5 wt. % to about 65 wt. % and more preferably from about 15 wt. % to about 60 wt. %. According to the invention, part or all of this percentage of anionic surfactant may include an extended chain anionic surfactant. Applicant demonstrations herein that even as little as 0.1 wt. % addition of an extended chain anionic surfactant gives improvements in foam stability and cleaning.

Positively Charged Polymer

According to the invention, the positively charged class of polymers such as polyethyleneimine (PEI) and its derivatives such as ethoxylated (PEI) polymers, polyamines, polyquats, polyglycerol quats, and other PEI derivatives, their salts or mixtures may use in the compositions of the invention. PEI is a polymeric amine or a polyamine, and include, polyethyleneimine compounds (PEI) and/or its derivatives. Polyethyleneimines may include primary, secondary or tertiary amine compounds. The polyethyleneimine compounds and/or its derivatives may include linear and/or branched polyethyleneimines. Still further, polyethyleneimines and/or its derivatives can vary significantly in molecular weight, topology and shape, including for example linear, branched or comb-like structures as a result of ring-opening polymerization of the ethylenimine. See Angelescu et al., *Langmuir,* 27, 9961-9971 (2011), which is incorporated herein by reference in its entirety. According to an aspect of the invention, the bleach activator may be a linear and/or branched polyethyleneimine.

Linear polyethyleneimines are made by the cationic polymerization of oxazoline and oxazine derivatives. Methods for preparing linear PEIs are more fully described in Advances in Polymer Science, Vol. 102, pgs. 171-188, 1992 (references 6-31) which is incorporated in its entirety herein by reference. Polyethyleneimines can also be made by the polymerization of aziridine to afford a polymeric amine often containing primary, secondary, and tertiary amine functionality. Commercial preparation of PEIs are generally acid-catalyzed reactions to open the ring of ethyleneimine, also known as aziridine as shown below.

Often the commercial production of ethyleneimine, which is subsequently catalyzed to open to form PEIs, is prepared through sulfuric acid esterification of ethanolamine, such as shown below:

(i)

$$HOCH_2CH_2NH_2 \xrightarrow{H_2SO_4} {}^{-}O_3SOCH_2CH_2NH_3^{+} + H_2O$$

-continued (ii)

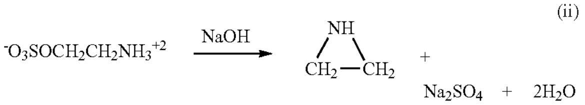

(iii)

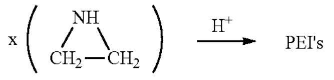

Suitable polyethyleneimine compounds useful in the present invention may contain a mixture of primary, secondary, and tertiary amine substituents. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary or tertiary amine substituents.

Exemplary PEI products include multifunctional cationic polyethyleneimines with branched polymer structures according to the following formulas ($-(CH_2-CH_2-NH)_n-$), with a molecular mass of 43.07 (as repeating units). In certain aspects the formula ($-(CH_2-CH_2-NH)_n-$) has a value of n that is at least 10 to 105, and wherein the nitrogen to carbon ratio is 1:2. PEI polymers have the general following polymer structure:

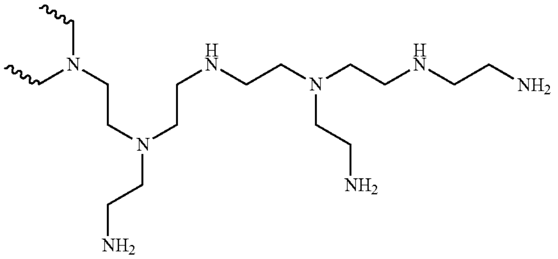

PEI products can also be represented by the following general formula, which may vary according to substitutions, size, molecular weight, branching, and the like:

$$(-NHCH_2CH_2-)_x[-N(CH_3CH_2NH_2)CH_2CH_2]_y$$

wherein x is an integer that is 1 or greater and y is an integer that is 1 or greater than 1. Preferably, wherein x is an integer from about 1 to about 120,000, preferably from about 2 to about 60,000, more preferably from about 3 to about 24,000 and y is an integer from about 1 to about 60,000, preferably from about 2 to about 30,000, more preferably from about 3 to about 12,000.

Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. Such exemplary polyethyleneimines are available as anhydrous polyethyleneimines and/or modified polyethyleneimines provided in aqueous solutions or methoyxypropanol (Lupasol® PO 100). The molar mass of the polyethyleneimines, including modified polyethyleneimines can vary from about 800 g/mol to at least 2,000,000 g/mol.

In certain aspects the polymeric amine bleach activators, and preferably the PEI bleach activators, may be a branched, spherical polymeric amine. In further aspects, the molecular weight of the polymeric amine bleach activators or PEI bleach is from about 100 Daltons to about 2 million Daltons (PEI-2,000,000), more preferably from about 100 Daltons to about 1 million Daltons (PEI-1,000,000), more preferably from about 500 Daltons to about 500 kDa (PEI-500,000), more preferably from about 500 Daltons to about 50 kDa (PEI-50,000), more preferably from about 800 Daltons to about 50 kDa (PEI-50,000), more preferably from about 800 Daltons to about 10 kDa (PEI-10,000). In further aspects, the charge density of the PEI or PEI salt is from about 15 meq/g to about 25 meq/g, more preferably from about 16 meq/g to about 20 meq/g. Commercially-available examples of such preferred PEIs include the BASF products LUPASOL® WF (25 kDa; 16-20 meq/g) and Lupasol® FG (800 Daltons; 16-20 meq/g), and the BASF products in the SOKALAN® family of polymers, e.g., SOKALAN® HP20, SOKALAN® HP22 G, and the like.

In an aspect, a polymeric amine may contain other substituents and/or and copolymers. For example, a polymeric amine may also include substituents, including for example ethoxylates and propoxylates. In an aspect of the invention, the polymeric amine, such as a polyethyleneimines, are derivatized with ethylene oxide (EO) and/or propylene oxide (PO) side chains. According to the invention, the PEI does not contain propylene oxide side chains. In an exemplary aspect of the invention ethoxylated PEIs may be heavily branched, wherein the substitutable hydrogens on the primary and secondary nitrogens are replaced with ethoxylated chains containing varying degrees of repeating units, such as the following polymer structure (generic for $PEI_{20}EO$):

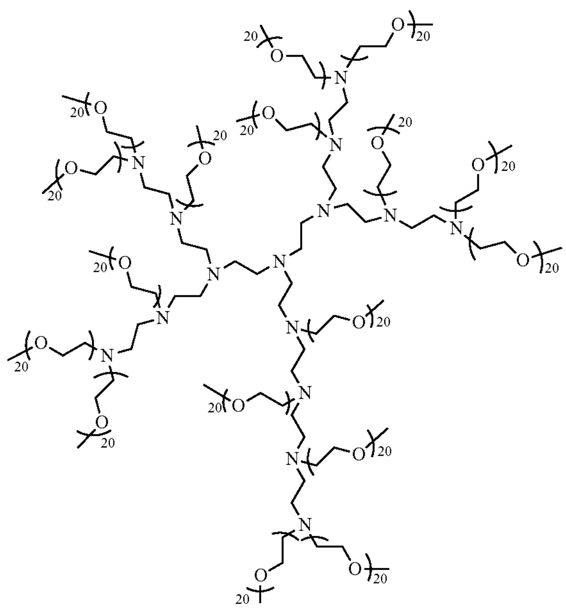

In an aspect, the bleach activator is a polyethyleneimine polymer with ethyleneoxide chains. Ethoxylation of PEIs increases the solubility of the bleach activator according to the invention.

A polymeric amine may also include copolymers, including for example ethylenediamine. A variety of substituents and/or copolymers may be included in order to modify the solubility or any other physical characteristics of a particular polymeric amine employed as a bleach activator according to the invention.

Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. In general, PEIs can be purchased as their protonated or unprotonated form with and without water. An example of a segment of a branched protonated polyethyleneimine (PEI salt) is shown below:

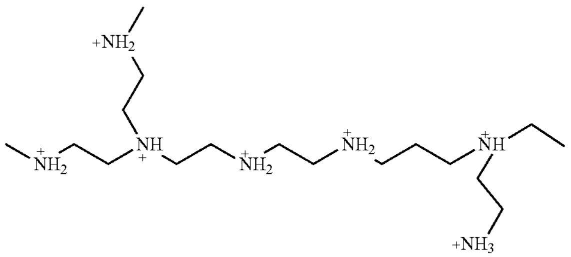 [SMILES: CCN(CCN)CCCNCCNCCN(CCNC)CCNC]

The counter ion of each protonated nitrogen center is balanced with an anion of an acid obtained during neutralization. Examples of protonated PEI salts include, but are not limited to, PEI-hydrochloride salt, PEI-sulfuric acid salt, PEI-nitric acid salt, PEI-acetic acid salt PEI fatty acid salt and the like. In fact, any acid can be used to protonate PEIs resulting in the formation of the corresponding PEI salt compound.

The cationic polymer, PEI is present in an amount of from about 0.01 wt. % to about 10 wt. %, preferably 0.1 wt. % to about 8 wt. % and most preferably from about 1 wt. % to about 5 wt. %.

Additional Surfactant

The cleaning composition can contain a nonionic surfactant component that includes a detersive amount of nonionic surfactant or a mixture of nonionic surfactants. Nonionic surfactants can be included in the cleaning composition to enhance grease removal properties. Although the surfactant component can include a nonionic surfactant component, it should be understood that the nonionic surfactant component can be excluded from the detergent composition.

Additional nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt %.

Other nonionic surfactants include alcohol alkoxylates. An suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the detergent composition concentrate, they can be included in an amount of at least about 0.1 wt. % and can be included in an amount of up to about 20 wt. %. The composition can include about 0.1 to 30 wt. %, about 0.5 wt. % to about 25 wt. % or about 2 wt. % to about 20 wt. % of the nonionic surfactant.

Amphoteric surfactants can also be used to provide desired detersive properties. Suitable amphoteric surfactants that can be used include, but are not limited to: betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the detergent composition includes an amphoteric surfactant, the amphoteric surfactant can be included in an amount of about 0.1 wt % to about 15 wt %. The concentrate can include about 0.1 wt % to about 1.0 wt %, 0.5 wt % to about 12 wt % or about 2 wt % to about 10 wt % of the amphoteric surfactant.

The cleaning composition can contain a cationic surfactant component that includes a detersive amount of cationic surfactant or a mixture of cationic surfactants. Cationic co-surfactants that can be used in the cleaning composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride.

Hydrotope

The invention in detergent formulations typically includes a hydrotope agent of a short chain alkyl benzene or alkyl naphthalene sulfonate. The class of short chain alkyl benzene or alkyl naphthalene sulfonates work as both a hardening agent and as a hydrotrope and total dissolved solids control active in the composition. The group includes alkyl benzene sulfonates based on toluene, xylene, and cumene, and alkyl naphthalene sulfonates. Sodium toluene sulfonate and sodium xylene sulfonate are the best known hydrotopes. These have the general formula below:

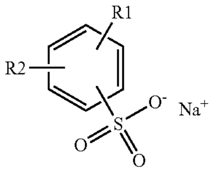

R1 = C1, C2 OR C3
R2 = C1 OR H
ALKYLBENZENE SULFONATE

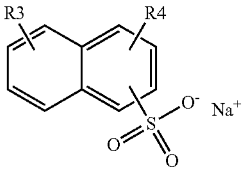

R3 = C1, C2, C3, C4 OR H
R4 = C1, C2, C3, C4 OR H
ALKYLNAPHTHALENE SULFONATE

This group includes but is not limited to sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butyl naphthalene sulfonate. In a preferred embodiment the hydrotope is SXS. The short chain alkyl benzene or alkyl naphthalene sulfonate may also function as a builder. In some embodiments, the hydrotope of a short chain alkyl benzene or alkyl naphthalene sulfonate is present in an amount of from about 0.01 wt. % to about 20 wt. %, preferably from about 0.1 wt. % to about 15 wt. % and more preferably from about 1 wt. % to about 10 wt. %.

Polar Carrier

The cleaning compositions of the invention may include a polar carrier media, such as water, alcohols, for example low molecular weight primary or secondary alcohols exemplified by methanol, ethanol, propanol, isopropanol, and the like, or other polar solvents, or mixtures and combinations thereof.

Polar carrier may be present in the composition in the range of about 10 to about 90%, in the range of about 20 to about 80%, or in the range of about 25 to 75% by weight based on the total weight of the composition.

Additional Components

While not essential for the purposes of the present invention, the non-limiting list of additional components illustrated hereinafter are suitable for use in the instant compositions and may be desirably incorporated in certain embodiments of the invention, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable additional materials include, but are not limited to, additional surfactants, builders, chelating agents, dye transfer inhibiting agents, viscosity modifiers, dispersants, enzymes, and enzyme stabilizers, catalytic materials, bleaches, bleach activators, hydrogen peroxide, sources of hydrogen peroxide, preformed peracids, polymeric dispersing agents, threshold inhibitors for hard water precipitation pigments, clay soil removal/anti-redeposition agents, brighteners, suds suppressors, dyes, fabric hueing agents, perfumes, structure elasticizing agents, fabric softeners, carriers, processing aids, solvents, pigments antimicrobials, pH buffers, processing aids, active fluorescent whitening ingredient, and mixtures thereof. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' compositions. Thus, certain embodiments of Applicants' compositions do not contain additional materials. However, when one or more additional materials are present, such one or more additional components may be present as detailed below:

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C—O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen; (2) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (3) bleach activators having R—(C—O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Additional Surfactant—In some embodiments, the compositions of the invention include an additional surfactant. Additional surfactants can be anionic, nonionic, cationic zwitterionic and can also include additional extended chain surfactant as discussed herein.

Builders—The cleaning compositions of the present invention may comprise one or more detergent builders or builder systems. When a builder is used, the subject composition will typically comprise at least about 1%, from about 5% to about 60% or even from about 10% to about 40% builder by weight of the subject composition. The detergent may contain an inorganic or organic detergent builder which counteracts the effects of calcium, or other ion, water hardness. Examples include the alkali metal citrates, succinates, malonates, carboxymethyl succinates, carboxylates, polycarboxylates and polyacetyl carboxylate; or sodium, potassium and lithium salts of oxydisuccinic acid, mellitic acid, benzene polycarboxylic acids, and citric acid; or citric acid and citrate salts. Organic phosphonate type sequestering agents such as DEQUEST® by Monsanto and alkanehydroxy phosphonates are useful. Other organic builders include higher molecular weight polymers and copolymers, e.g., polyacrylic acid, polymaleic acid, and polyacrylic/polymaleic acid copolymers and their salts, such as SOKALAN® by BASF. Generally, the builder may be up to 30%, or from about 1% to about 20%, or from about 3% to about 10%.

The compositions may also contain from about 0.01% to about 10%, or from about 2% to about 7%, or from about 3% to about 5% of a $C_{8-20}$ fatty acid as a builder. The fatty acid can also contain from about 1 to about 10 EO units. Suitable fatty acids are saturated and/or unsaturated and can be obtained from natural sources such a plant or animal esters (e.g., palm kernel oil, palm oil, coconut oil, babassu oil, safflower oil, tall oil, tallow and fish oils, grease, and mixtures thereof), or synthetically prepared (e.g., via the oxidation of petroleum or by hydrogenation of carbon monoxide via the Fisher Tropsch process). Useful fatty acids are saturated $C_{12}$ fatty acid, saturated $C_{12-14}$ fatty acids, saturated or unsaturated $C_{12-18}$ fatty acids, and a mixture thereof. Examples of suitable saturated fatty acids include captic, lauric, myristic, palmitic, stearic, arachidic and behenic acid. Suitable unsaturated fatty acids include: palmitoleic, oleic, linoleic, linolenic and ricinoleic acid.

Fillers—A composition may include a minor but effective amount of one or more of a detergent filler which does not perform as a cleaning agent per se, but cooperates with the cleaning agent to enhance the overall cleaning capacity of the composition. Examples of fillers suitable for use in the present cleaning compositions include sodium sulfate, sodium chloride, starch, sugars, $C_1$-$C_{10}$ alkylene glycols such as propylene glycol, and the like. Inorganic or phosphate-containing detergent builders may include alkali metal, ammonium and alkanolammonium salts of polyphosphates (e.g. tripolyphosphates, pyrophosphates, and glassy polymeric meta-phosphates). Non-phosphate builders may also be used. A detergent filler may be included in an amount of 1-20 wt %, or 3-15 wt %.

Chelating Agents—The cleaning compositions herein may contain a chelating agent. Suitable chelating agents include copper, iron and/or manganese chelating agents and mixtures thereof. When a chelating agent is used, the subject composition may comprise from about 0.005% to about 15% or even from about 3.0% to about 10% chelating agent by weight of the subject composition also contain dispersants. Suitable water-soluble organic materials include the homo- or co-polymeric acids or their salts, in which the polycarboxylic acid comprises at least two carboxyl radicals separated from each other by not more than two carbon atoms.

Enzymes—The cleaning compositions can comprise one or more enzymes which provide cleaning performance and/or fabric care benefits. Enzymes can be included herein for a wide variety of fabric laundering purposes, including removal of protein-based, carbohydrate-based, or triglyceride-based stains, for example, and/or for fabric restoration. Examples of suitable enzymes include, but are not limited to, hemicellulases, peroxidases, proteases, cellulases, xylanases, lipases, phospholipases, esterases, cutinases, pectinases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, or combinations thereof and may be of any suitable origin. The choice of enzyme(s) takes into account factors such as pH-activity, stability optima, thermostability, stability versus active detergents, chelants, builders, etc. A detersive enzyme mixture useful herein is a protease, lipase, cutinase and/or cellulase in conjunction with amylase. Sample detersive enzymes are described in U.S. Pat. No. 6,579,839.

Enzymes are normally present at up to about 5 mg, more typically from about 0.01 mg to about 3 mg by weight of active enzyme per gram of the detergent. Stated another way, the detergent herein will typically contain from about 0.001% to about 5%, or from about 0.01% to about 2%, or from about 0.05% to about 1% by weight of a commercial enzyme preparation. Protease enzymes are present at from about 0.005 to about 0.1 AU of activity per gram of detergent. Proteases useful herein include those like subtilisins from *Bacillus* [e.g. *subtilis, lentus, licheniformis, amyloliquefaciens* (BPN, BPN'), alcalophilus] e.g. Esperase®, Alcalase®, Everlase® and Savinase® (Novozymes), BLAP and variants (Henkel). Further proteases are described in EP 130756, WO 91/06637, WO 95/10591 and WO 99/20726.

Amylases are described in GB Pat. #1 296 839, WO 94/02597 and WO 96/23873; and available as Purafect Ox Am® (Genencor), Termamyl®, Natalase®, Ban®, Fungamyl®, Duramyl® (all Novozymes), and RAPIDASE (International Bio-Synthetics, Inc).

The cellulase herein includes bacterial and/or fungal cellulases with a pH optimum between 5 and 9.5. Suitable cellulases are disclosed in U.S. Pat. No. 4,435,307 to Barbesgoard, et al., issued Mar. 6, 1984. Cellulases useful herein include bacterial or fungal cellulases, e.g. produced by *Humicola insolens*, particularly DSM 1800, e.g. 50 kD and ~43 kD (Carezyyme®). Additional suitable cellulases are the EGIII cellulases from *Trichoderma longibrachiatum*. WO 02/099091 by Novozymes describes an enzyme exhibiting endo-beta-glucanase activity (EC 3.2.1.4) endogenous to *Bacillus* sp., DSM 12648; for use in detergent and textile applications; and an anti-redeposition endoglucanase in WO 04/053039. Kao's EP 265 832 describes alkaline cellulase K, CMCase I and CMCase II isolated from a culture product of *Bacillus* sp KSM-635. Kao further describes in EP 1 350 843 (KSM 5237; 1139; KSM 64; KSM N131), EP 265 832A (KSM 635, FERM BP 1485) and EP 0 271 044 A (KSM 534, FERM BP 1508; KSM 539, FERM BP 1509; KSM 577, FERM BP 1510; KSM 521, FERM BP 1507; KSM 580, FERM BP 1511; KSM 588, FERM BP 1513; KSM 597, FERM BP 1514; KSM 522, FERM BP 1512; KSM 3445, FERM BP 1506; KSM 425. FERM BP 1505) readily-mass producible and high activity alkaline cellulases/endo-glucanases for an alkaline environment. Such endoglucanase may contain a polypeptide (or variant thereof) endogenous to one of the above *Bacillus* species. Other suitable cellulases are Family 44 Glycosyl Hydrolase enzymes exhibiting endo-beta-1,4-glucanase activity from *Paenibacilus polyxyma* (wild-type) such as XYG1006 described in WO 01/062903 or variants thereof. Carbohydrases useful herein include e.g. mannanase (see, e.g., U.S. Pat. No. 6,060,299), pectate lyase (see, e.g., WO99/27083), cyclomaltodextrin glucanotransferase (see, e.g., WO96/33267), and/or xyloglucanase (see, e.g., WO99/02663). Bleaching enzymes useful herein with enhancers include e.g. peroxidases, laccases, oxygenases, lipoxygenase (see, e.g., WO 95/26393), and/or (non-heme) haloperoxidases.

Suitable endoglucanases include: 1) An enzyme exhibiting endo-beta-1,4-glucanase activity (E.C. 3.2.1.4), with a sequence at least 90%, or at least 94%, or at least 97% or at least 99%, or 100% identity to the amino acid sequence of positions 1-773 of SEQ ID NO:2 in WO 02/099091; or a fragment thereof that has endo-beta-1,4-glucanase activity. GAP in the GCG program determines identity using a GAP creation penalty of 3.0 and GAP extension penalty of 0.1. See WO 02/099091 by Novozymes A/S on Dec. 12, 2002, e.g., Celluclean™ by Novozymes A/S. GCG refers to sequence analysis software package (Accelrys, San Diego, Calif., USA). GCG includes a program called GAP which uses the Needleman and Wunsch algorithm to find the alignment of two complete sequences that maximizes the number of matches and minimizes the number of gaps; and 2) Alkaline endoglucanase enzymes described in EP 1 350 843A published by Kao on Oct. 8, 2003 ([0011]-[0039] and examples 1-4).

Suitable lipases include those produced by *Pseudomonas* and *Chromobacter*, and LIPOLASE®, LIPOLASE ULTRA®, LIPOPRIME® and LIPEX® from Novozymes. See also Japanese Patent Application 53-20487, laid open on Feb. 24, 1978, available from Areario Pharmaceutical Co. Ltd., Nagoya, Japan, under the trade name Lipase P "Amann". Other commercial lipases include Amano-CES, lipases ex *Chromobacter viscosum*, available from Toyo Jozo Co., Tagata, Japan; and *Chromobacter viscosum* lipases from U.S. Biochemical Corp., U.S.A. and Diosynth Co., The Netherlands, and lipases ex *Pseudomonas gladioli*. Also suitable are cutinases [EC 3.1.1.50] and esterases.

Enzymes useful for liquid detergent formulations, and their incorporation into such formulations, are disclosed in U.S. Pat. No. 4,261,868 to Hora, et al., issued Apr. 14, 1981. In an embodiment, the liquid composition herein is substantially free of (i.e. contains no measurable amount of) wild-type protease enzymes. A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers—Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

A useful enzyme stabilizer system is a calcium and/or magnesium compound, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth) acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof. The detergent may contain a reversible protease inhibitor e.g., peptide or protein type, or a modified subtilisin inhibitor of family VI and the plasminostrepin; leupeptin, peptide trifluoromethyl ketone, or a peptide aldehyde. Enzyme stabilizers are present from about 1 to about 30, or from about 2 to about 20, or from about 5 to about 15, or from about 8 to about 12, millimoles of stabilizer ions per liter.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof. In some embodiments, the solvent includes water. The water can include water from any source including deionized water, tap water, softened water, and combinations thereof. Solvents are typically present at from about 0.1% to about 50%, or from about 0.5% to about 35%, or from about 1% to about 15% by weight.

Form of the Compositions

Soaking Composition

The present invention relates to a soaking composition and methods of using the soaking composition to remove grease and food soils from surfaces without significant corrosive or detrimental effects on the aesthetics of such surfaces. In addition to loosening greasy, baked on soils, the soaking solution also protects the surface of the ware both while soaking in the soaking composition and while passing through a dishmachine. The soaking composition is used to loosen grease and food soils on ware, such as pots and pans, before the pots and pans are run through a dishmachine. The soaking step reduces the number of washes soiled ware must undergo to remove the soils when compared to not using a soaking composition, soaking with water, or soaking with a manual detergent. The soaking composition can be used on ware made of various materials, including, for example: stainless steel, aluminum, cast iron and plastics. A particularly suitable application for the soaking composition is removing grease and organic soils from pots and pans.

The soaking composition loosens grease and soil from the surface such that the soil is substantially removed from the surface when the ware is passed through a single cycle of a dishmachine. In addition, no personal protective equipment is needed when the soaking composition is used at the recommended concentration and with the recommended procedures.

Typically, when ware is soaked in a solution and then removed and placed into a dishmachine, a small quantity of the soaking solution is carried with the ware. Because the soaking composition is used prior to placing the ware in a dishmachine for cleaning, components in the soaking composition may produce foam. The soaking composition is formulated to produce lower foam than typical pot and pan detergents when agitated. This lower foaming property allows the soaking composition to be used in combination with a dishmachine without excessive carryover.

The detergent/soaking compositions of the present invention may be of any suitable form, including paste, liquid, solid (such as tablets, powder/granules), foam or gel, with powders and tablets being preferred. The composition may be in the form of a unit dose product, i.e. a form which is designed to be used as a single portion of detergent composition in a washing operation. Of course, one or more of such single portions may be used in a cleaning operation.

Solid forms include, for example, in the form of a tablet, rod, ball or lozenge. The composition may be a particulate form, loose or pressed to shape or may be formed by injection moulding or by casting or by extrusion. The composition may be encased in a water soluble wrapping, for, example of PVOH or a cellulosic material. The solid product may be provided as a portioned product as desired.

The composition may also be in paste, gel or liquid form, including unit dose (portioned products) products. Examples include a paste, gel or liquid product at least partially surrounded by, and preferably substantially enclosed in a water-soluble coating, such as a polyvinyl alcohol package. This package may for instance take the form of a capsule, a pouch or a moulded casing (such as an injection moulded casing) etc. Preferably the composition is substantially surrounded by such a package, most preferably totally surrounded by such a package. Any such package may contain one or more product formats as referred to herein and the package may contain one or more compartments as desired, for example two, three or four compartments.

If the composition is a foam, a liquid or a gel it is preferably an aqueous composition although any suitable solvent may be used.

Dispensing/Use of the Soaking Composition

The soaking composition can be dispensed as a concentrate or as a use solution. In addition, the soaking composition concentrate can be provided in a solid form or in a liquid form. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm.

The use solution can be applied to the substrate during a presoak application, for example, in a warewashing machine, a car wash application, institutional healthcare surface cleaning or the like. In some embodiments, formation of a use solution can occur from a presoak agent installed in a cleaning machine, for example onto a dish rack. The presoak agent can be diluted and dispensed from a dispenser mounted on or in the machine or from a separate dispenser that is mounted separately but cooperatively with the dish machine.

In other example embodiments, solid products may be conveniently dispensed by inserting a solid material in a container or with no enclosure into a spray-type dispenser such as the volume SOL-ET controlled ECOTEMP Injection Cylinder system manufactured by Ecolab Inc., St. Paul, Minn. Such a dispenser cooperates with a washing machine. When demanded by the machine, the dispenser directs water onto the solid block of agent which effectively dissolves a portion of the block creating a concentrated aqueous presoak solution which is then fed directly into the water forming the aqueous pre-soak. The aqueous pre-soak is then contacted with the surfaces to affect a soaking composition. This dispenser and other similar dispensers are capable of controlling the effective concentration of the active portion in the aqueous composition by measuring the volume of material dispensed, the actual concentration of the material in the water (an electrolyte measured with an electrode) or by measuring the time of the spray on the solid block.

Processes of Making Cleaning Compositions

The compositions of the invention may be made by any suitable method depending upon their format. Suitable manufacturing methods for detergent compositions are well known in the art, non-limiting examples of which are described in U.S. Pat. Nos. 5,879,584; 5,691,297; 5,574,005; 5,569,645; 5,565,422; 5,516,448; 5,489,392; and 5,486,303. Various techniques for forming detergent compositions in solid forms are also well known in the art, for example, detergent tablets may be made by compacting granular/particular material and may be used herein.

In one aspect, the compositions disclosed herein may be prepared by combining the components thereof in any convenient order and by mixing, e.g., agitating, the resulting component combination to form a phase stable liquid composition. In one aspect, a liquid matrix is formed containing at least a major proportion, or even substantially all, of the liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

Conversely, nothing in the specification shall be also understood to limit the forming of a "super-concentrated" cleaning composition based upon the composition described above. Such a super-concentrated ingredient composition is essentially the same as the cleaning compositions described above except in that they include a lesser amount of water.

The above description provides a basis for understanding the broad meets and bounds of the invention. The following examples and test data provide an understanding of certain specific embodiments of the invention. These examples are not meant to limit the scope of the invention. Unless otherwise noted, all parts, percentages, and ratios reported in the following examples are on a weight basis, and all reagents used in the examples were obtained, or are available, from the chemical suppliers described below, or may be synthesized by conventional techniques.

EXAMPLES (I) Structural Comparison Between X-AES and LES

LES: $C_{12-14}$ $(EO)_2$-sulfate

X-AES: $C_{12-14}$-$(PO)_{16}$-$(EO)_2$-sulfate

As shown above, X-AES, is structurally similar to LES except for the 16 moles PO extension. Commercially, LES is commonly provided as 60% active, and currently, X-AES is provided as 24% active.

(II) 100% of the SLES Replaced with X-AES

Figure 2:
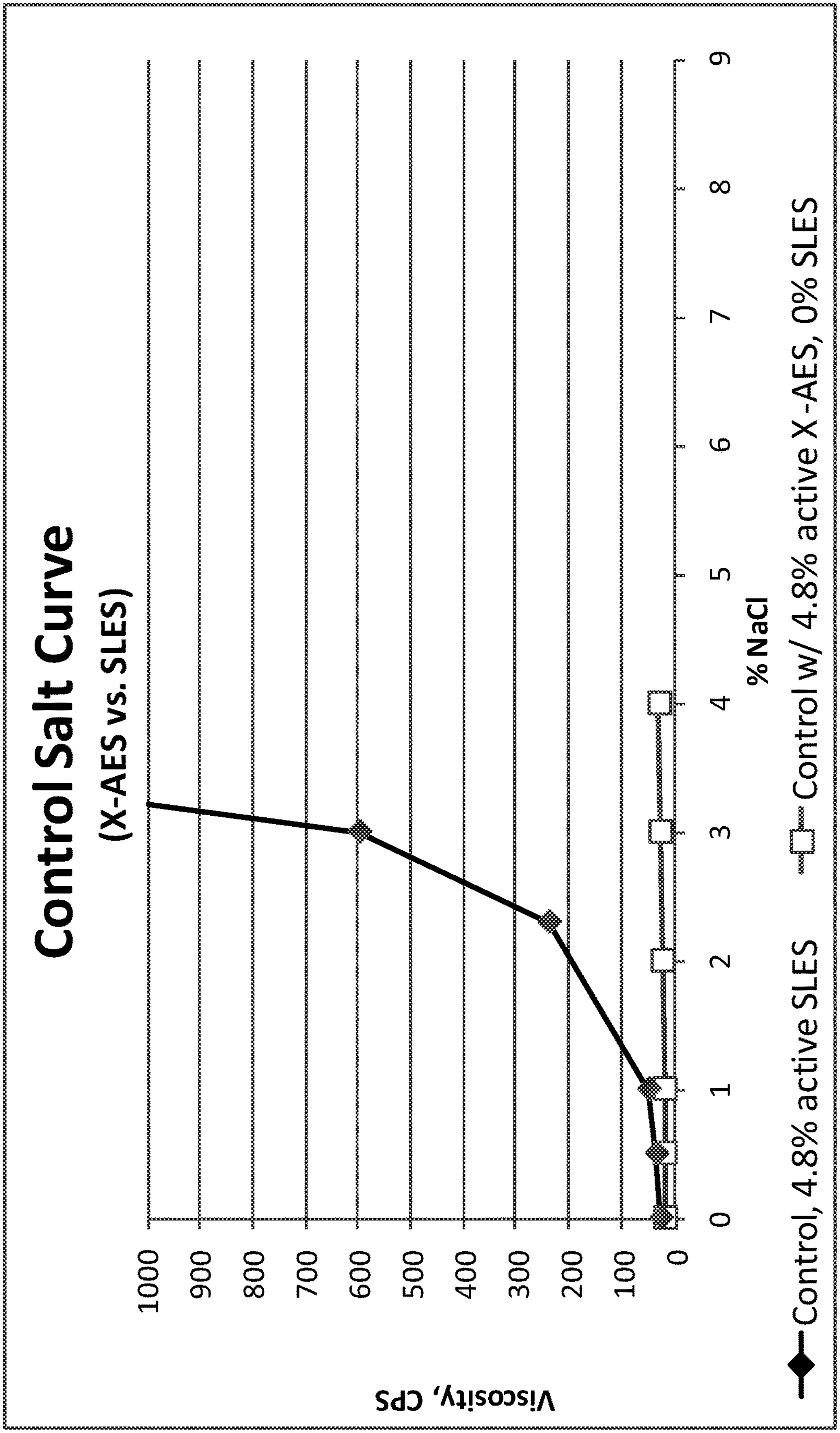
FIG. 2 is a graph of a salt curve showing viscosity over percent NaCl with a traditional pot and pan soaking composition with SLES compared to the same composition with SLES replaced with X-AES.
Figure 3:
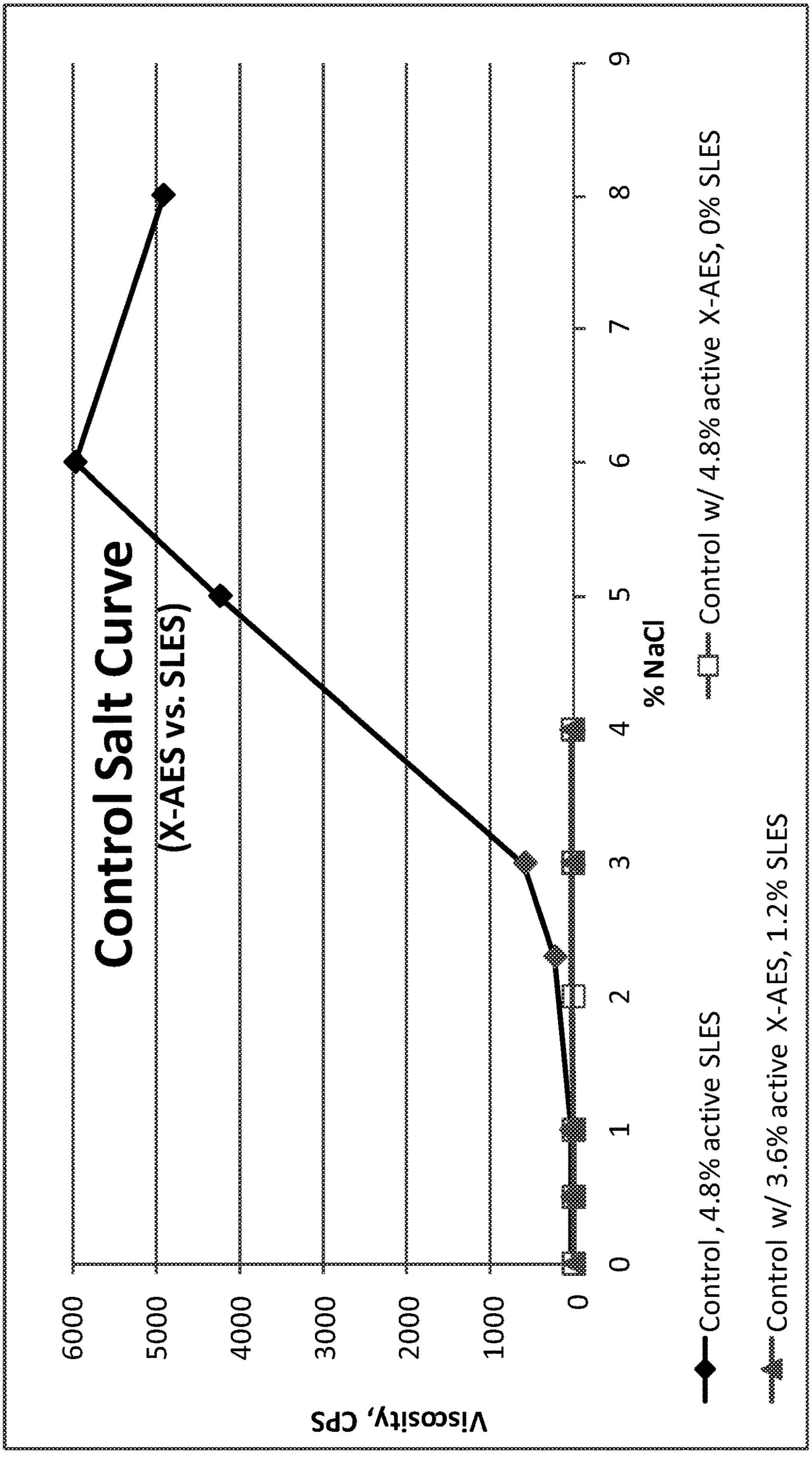
FIG. 3 is a graph showing viscosity over percent NaCl salt curve of a traditional pot and pan soaking composition with SLES, compared to compositions with partial SLES and total SLES replacement with X-AES.
Figure 4:
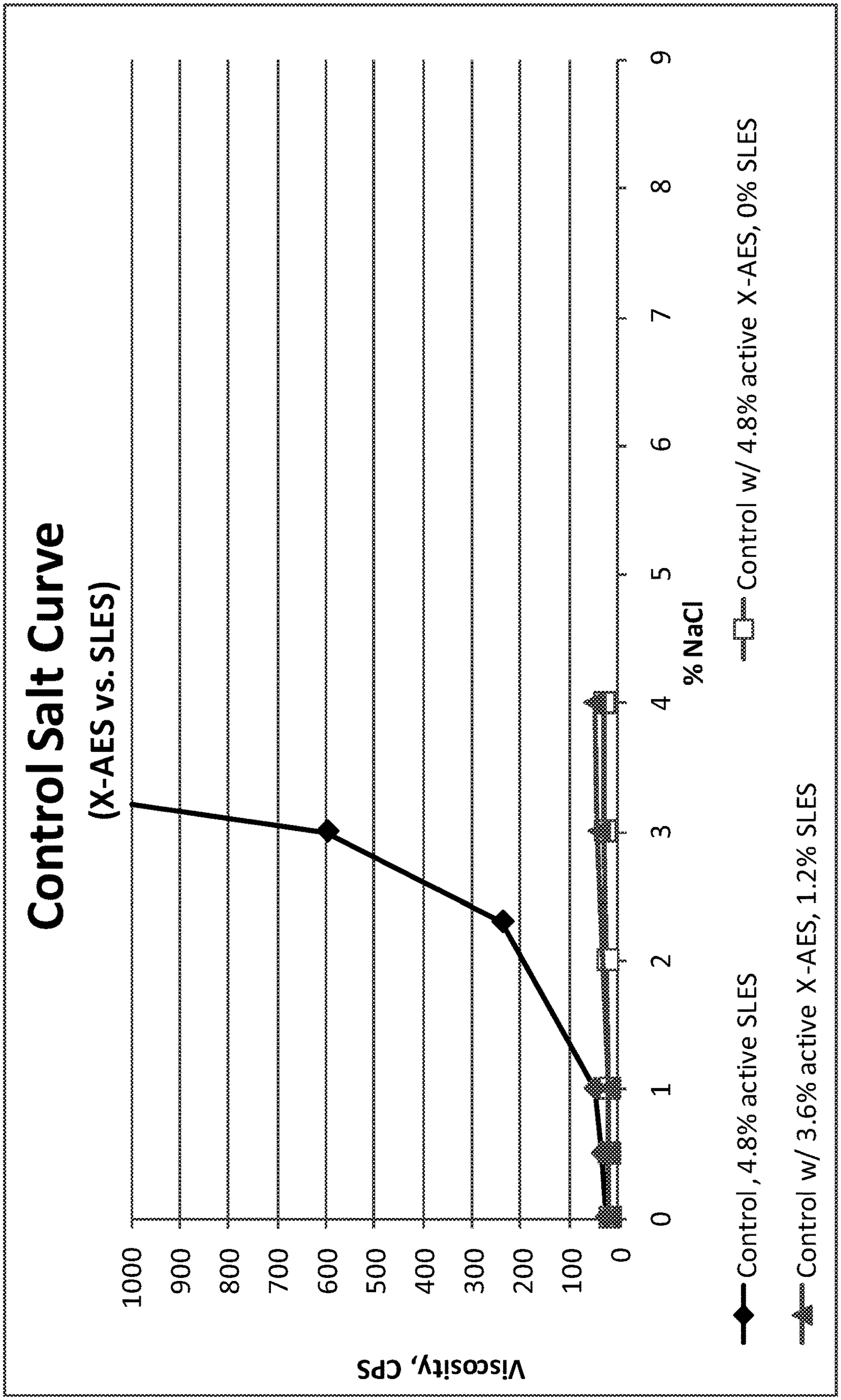
FIG. 4 is a salt curve graph comparing a traditional pot and pan soaking composition with SLES, compared to compositions with partial SLES and total SLES replacement with X-AES with the viscosity depicted lower intervals.
Figure 5:
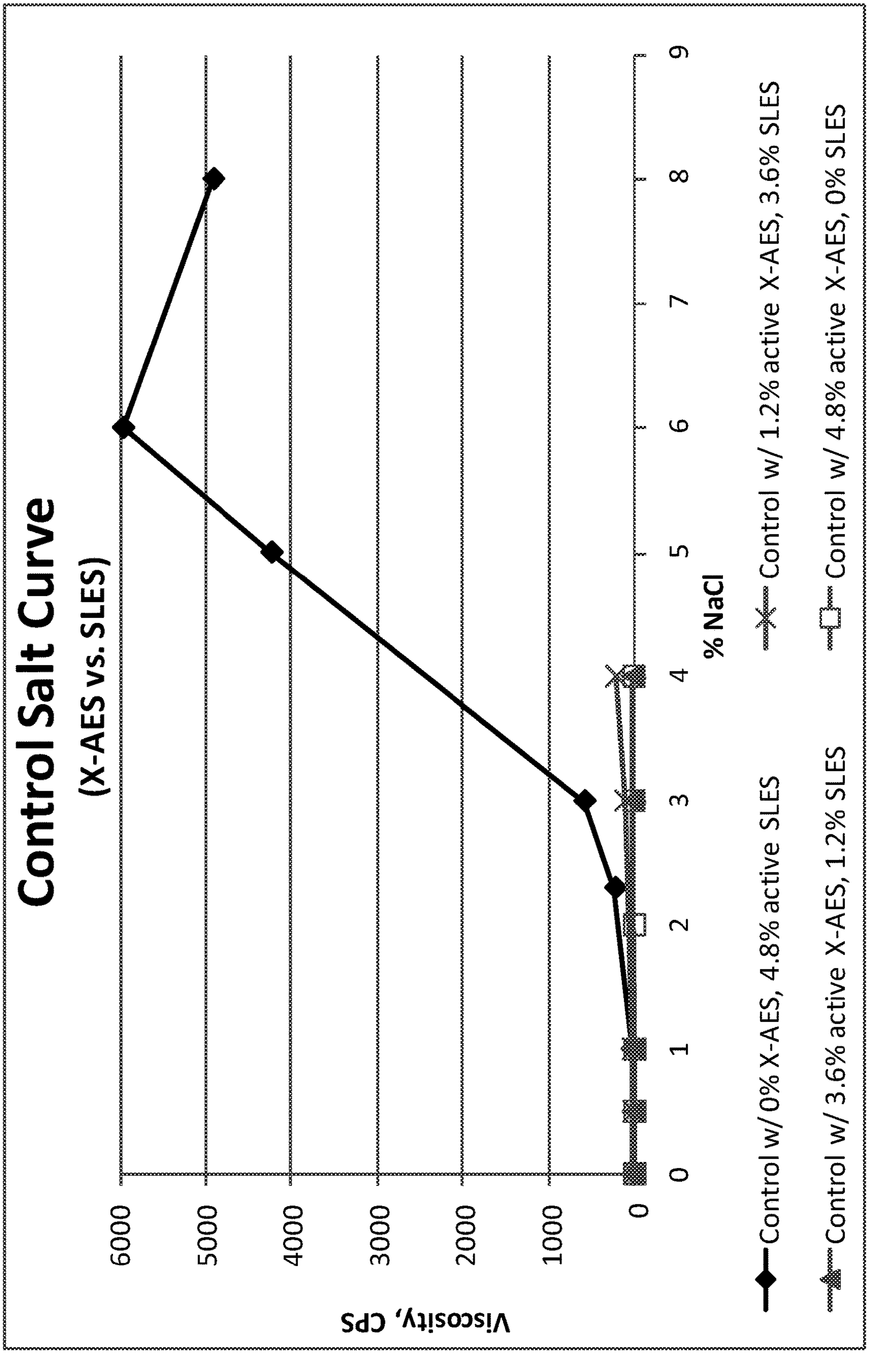
FIG. 5 is a salt curve graph comparing a traditional pot and pan soaking composition with SLES, compared to compositions with partial SLES and total SLES replacement with X-AES.
Figure 6:
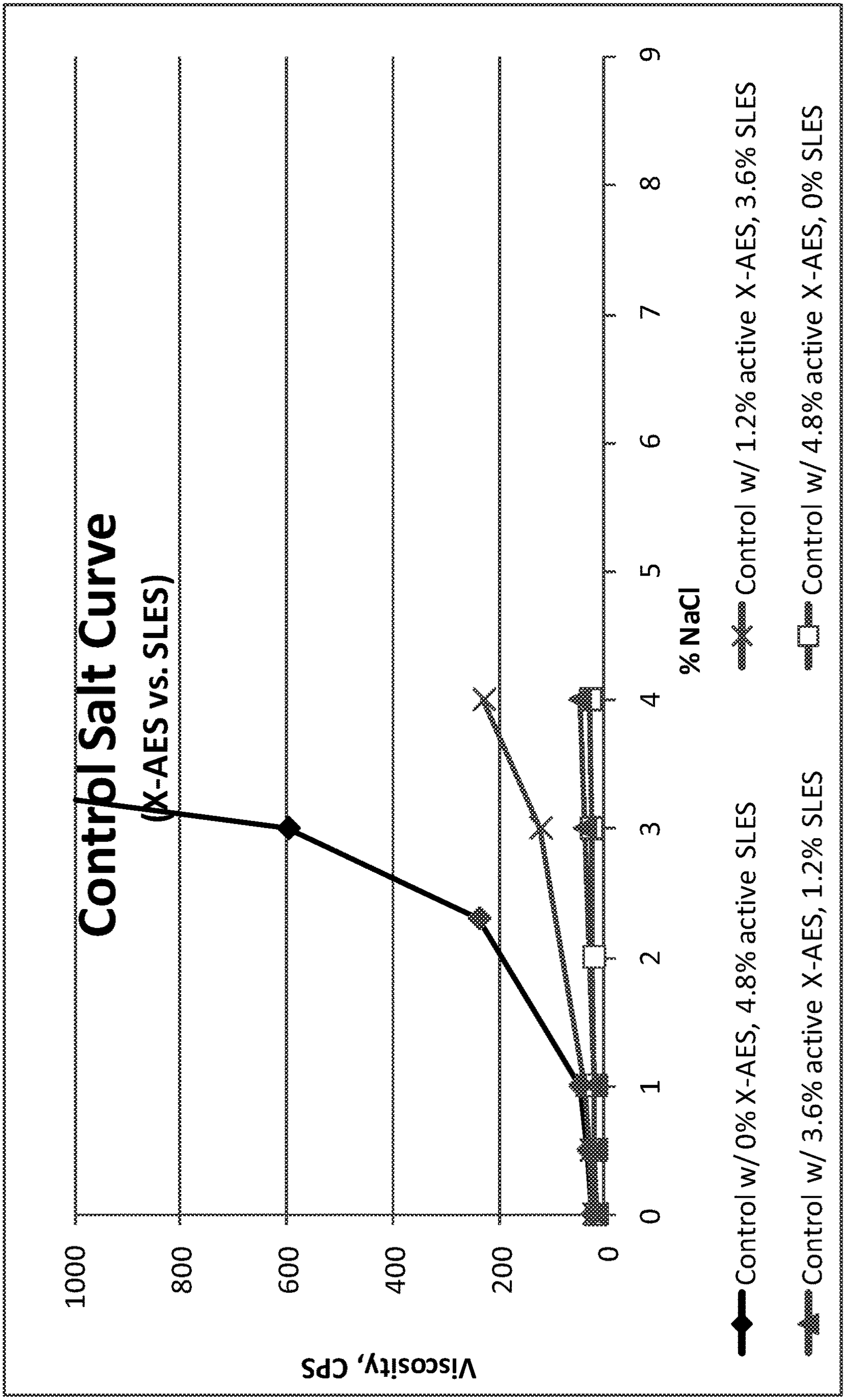
FIG. 6 is a salt curve graph comparing a traditional pot and pan soaking composition with SLES, compared to compositions with partial SLES and total SLES replacement with X-AES with the viscosity depicted lower intervals.

In the following compositions (Table 1), A commercially available cocamide DEA free pot and pan soaking composition was tested (control). The other compositions have all of the LES replaced with X-AES, and have varying level of NaCl to determine the "salt curve" behavior (FIGS. 1 and 2).

The results clearly show that the salt curve has been completely flattened, suggesting that the high moles of PO extension on X-AES reduces or inhibits the formation of micellar structures such as entangled long rod micelles that are responsible for high viscoelasticity with the "salt curve".

TABLE 1

Control with X-AES
Salt concentration vs. viscosity

| Control CocoDEA free | % active surfactant | | Control | Control w/ X-AES #52 | Control w/ X-AES #53 | Control w/ X-AES #54 | Control w/ X-AES #55 | Control w/ X-AES #56 | Control w/ X-AES #57 |
|---|---|---|---|---|---|---|---|---|---|
| Water Zeolite Softened | | 100016 | 47.60 | 37.90 | 37.40 | 36.90 | 35.90 | 34.90 | 33.90 |
| Sodium Chloride | | 142059 | 2.30 | 0.00 | 0.50 | 1.00 | 2.00 | 3.00 | 4.00 |
| Sodium Xylene Sulfonate 40% | | 171371 | 3.50 | 3.50 | 3.50 | 3.50 | 3.50 | 3.50 | 3.50 |
| PEI Ethoxylate | 80 | 280787 | 0.50 | 0.50 | 0.50 | 0.50 | 0.50 | 0.50 | 0.50 |
| Sodium C14-16 Olefin Sulfonate (40%) | 40 | 171318 | 22.50 | 22.50 | 22.50 | 22.50 | 22.50 | 22.50 | 22.50 |
| Sodium Laur Ether Ethox Sulfat 60% | 60 | 171405 | 8.00 | | | | | | |
| X-AES, 24% | 24 | | | 20.00 | 0.00 | 20.00 | 20.00 | 20.00 | 20.00 |
| Lauryl Dimethylamine Oxide 30% | 30 | 172452 | 15.60 | 15.60 | 15.60 | 15.60 | 15.60 | 15.60 | 15.60 |
| TOTAL: | | | 100.00 | 100.00 | 100.00 | 100.00 | 100.00 | 100.00 | 100.00 |
| % active SLES | | | 4.8 | 0 | 0 | 0 | 0 | 0 | 0 |
| % active X-AES | | | 0 | 4.8 | 4.8 | 4.8 | 4.8 | 4.8 | 4.8 |
| Total % active SLES + X-AES | | | 4.8 | 4.8 | 4.8 | 4.8 | 4.8 | 4.8 | 4.8 |
| Total % active Surfactant | | | 18.88 | 18.88 | 18.88 | 18.88 | 18.88 | 18.88 | 18.88 |
| Viscosity, spdl #2, 50 rpm, 74° F. | | | 238.3 | 17.6 | 18.4 | 18.4 | 22.4 | 28.4 | 28.8 |
| Foam Height, mls, 80° F. | | | 433 | | | | | 322 | |
| Foam Height, mls, 110° F. | | | 286 | | | | | 247 | |

(III) 75% of the SLES Replaced with X-AES

TABLE 2

| Control CocoDEA free | % active surfactant | | Control | Control w/ X-AES #58 | Control w/ X-AES #59 | Control w/ X-AES #60 | Control w/ X-AES #61 | Control w/ X-AES #62 | Control w/ X-AES #63 |
|---|---|---|---|---|---|---|---|---|---|
| Water Zeolite Softened | | 100016 | 47.60 | 40.90 | 40.40 | 39.90 | 38.90 | 37.90 | 36.90 |
| Sodium Chloride | | 142059 | 2.30 | 0.00 | 0.50 | 1.00 | 2.00 | 3.00 | 4.00 |
| Sodium Xylene Sulfonate 40% | | 171371 | 3.50 | 3.50 | 3.50 | 3.50 | 3.50 | 3.50 | 3.50 |
| PEI Ethoxylate | 80 | 290787 | 0.50 | 0.50 | 0.50 | 0.50 | 0.50 | 0.50 | 0.50 |
| Sodium C14-16 Olefin Sulfonate (40%) | 40 | 171318 | 22.50 | 22.50 | 22.50 | 22.50 | 22.50 | 22.50 | 22.50 |
| Sodium Laur Ether Ethox Sulfat 60% | 60 | 171405 | 8.00 | 2.00 | 2.00 | 2.00 | 2.00 | 2.00 | 2.00 |
| X-AES, 24% | 24 | | | 15.00 | 15.00 | 15.00 | 15.00 | 15.00 | 15.00 |
| Lauryl Dimethylamine Oxide 30% | 30 | 172452 | 15.60 | 15.60 | 15.60 | 15.60 | 15.60 | 15.60 | 15.60 |
| TOTAL: | | | 100.00 | 100.00 | 100.00 | 100.00 | 100.00 | 100.00 | 100.00 |
| % acive SLES | | | 4.8 | 1.2 | 1.2 | 1.2 | 1.2 | 1.2 | 1.2 |
| % active X-AES | | | 0 | 3.6 | 3.6 | 3.6 | 3.6 | 3.6 | 3.6 |
| Total % active SLES + X-AES | | | 4.8 | 4.8 | 4.8 | 4.8 | 4.8 | 4.8 | 4.8 |
| Total % active surfactant | | | 18.88 | 18.88 | 18.88 | 18.88 | 18.88 | 18.88 | 18.88 |
| Viscosity, spdl 2, 50 rpm, cps, 74° F. | | | 238.3 | 19.2 | 19.2 | 20.8 | | 40 | 48.8 |
| Foam Height, mls, 80° F. | | | 433 | | | | | 349 | |
| Foam Height, mls, 110° F. | | | 286 | | | | | 228 | |
| Appearance | | | | clear sol'n | clear sol'n | clear sol'n | | clear sol'n | clear sol'n |

(IV) 25% of the SLES Replaced with X-AES

TABLE 3

| Control CocoDEA free | % active surfactant | | Control | Control w/ X-AES #64 | Control w/ X-AES #65 | Control w/ X-AES #66 | Control w/ X-AES #67 | Control w/ X-AES #68 | Control w/ X-AES #69 |
|---|---|---|---|---|---|---|---|---|---|
| Water Zeolite Softened | | 100016 | 47.60 | 46.90 | 46.40 | 46.28 | 44.90 | 43.90 | 42.90 |
| Sodium Chloride | | 142059 | 2.30 | 0.00 | 0.50 | 1.00 | 2.00 | 3.00 | 4.00 |
| Sodium Xylene Sulfonate 40% | | 171371 | 3.50 | 3.50 | 3.50 | 3.50 | 3.50 | 3.50 | 3.50 |
| PEI Ethoxylate | 80 | 290787 | 0.50 | 0.50 | 0.50 | 0.50 | 0.50 | 0.50 | 0.50 |
| Sodium C14-16 Olefin Sulfonate (40%) | 40 | 171318 | 22.50 | 22.50 | 22.50 | 22.50 | 22.50 | 22.50 | 22.50 |
| Sodium Laur Ether Ethox Sulfat 60% | 80 | 171405 | 8.00 | 6.00 | 6.00 | 6.00 | 8.00 | 6.00 | 6.00 |
| X-AES, 24% | 24 | | | 5.00 | 5.00 | 5.00 | 5.00 | 5.00 | 5.00 |
| Lauryl Dimethylamine Oxide 30% | 30 | 172452 | 15.60 | 15.60 | 15.60 | 15.60 | 15.60 | 15.60 | 15.60 |
| TOTAL: | | | 100.00 | 100.00 | 100.00 | 100.38 | 100.00 | 100.00 | 100.00 |
| % active SLES | | | 4.8 | 3.6 | 3.6 | 3.6 | 3.6 | 3.6 | 3.6 |
| % active X-AES | | | 0 | 1.2 | 1.2 | 1.2 | 1.2 | 1.2 | 1.2 |
| Total % active SLES+X-AES | | | 48 | 4.8 | 4.8 | 4.8 | 4.8 | 4 8 | 48 |
| Total % active surfactant | | | 18.88 | 18.88 | 18.88 | 18.88 | 18.88 | 18.88 | 18.88 |
| Viscosity, spdl 2, 50 rpm, cps, 74° F. | | | 238.3 | 22.4 | 27.2 | 36 | | 122.4 | 229.6 |
| Foam Height, mls, 80° F. | | | 433 | | | | | 354 | |
| Foam Height, mls, 110° F. | | | 286 | | | | | 253 | |
| Appearance | | | | clear sol'n | clear sol'n | clear sol'n | | clear sol'n | clear sol'n |

(V) 10% of the SLES Replaced with X-AES

Figure 7:
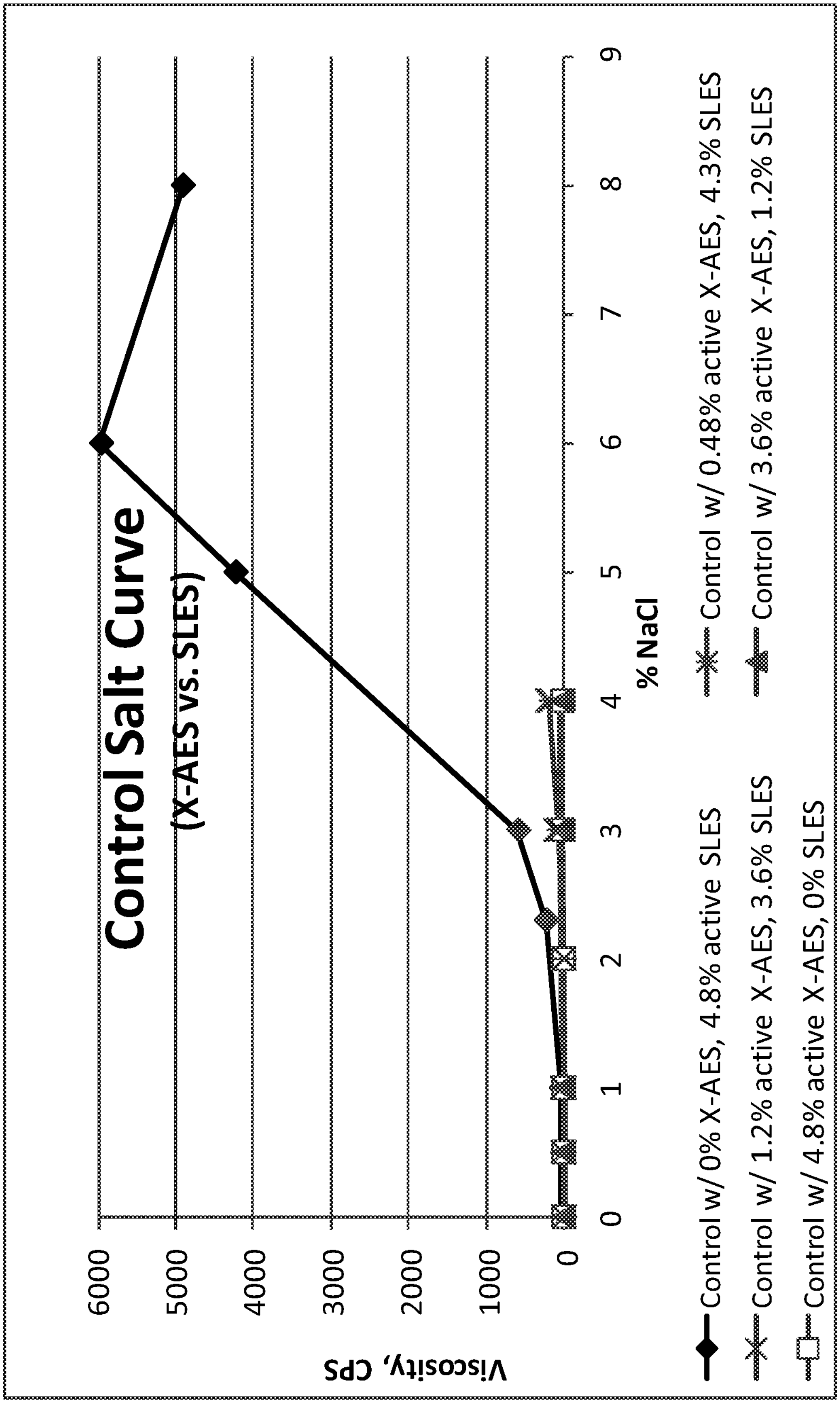
FIG. 7 is a salt curve graph comparing a traditional pot and pan soaking composition with SLES, compared to compositions with partial SLES (as low as 1/10 of the SLES preplaced) and total SLES replacement with X-AES.
Figure 8:
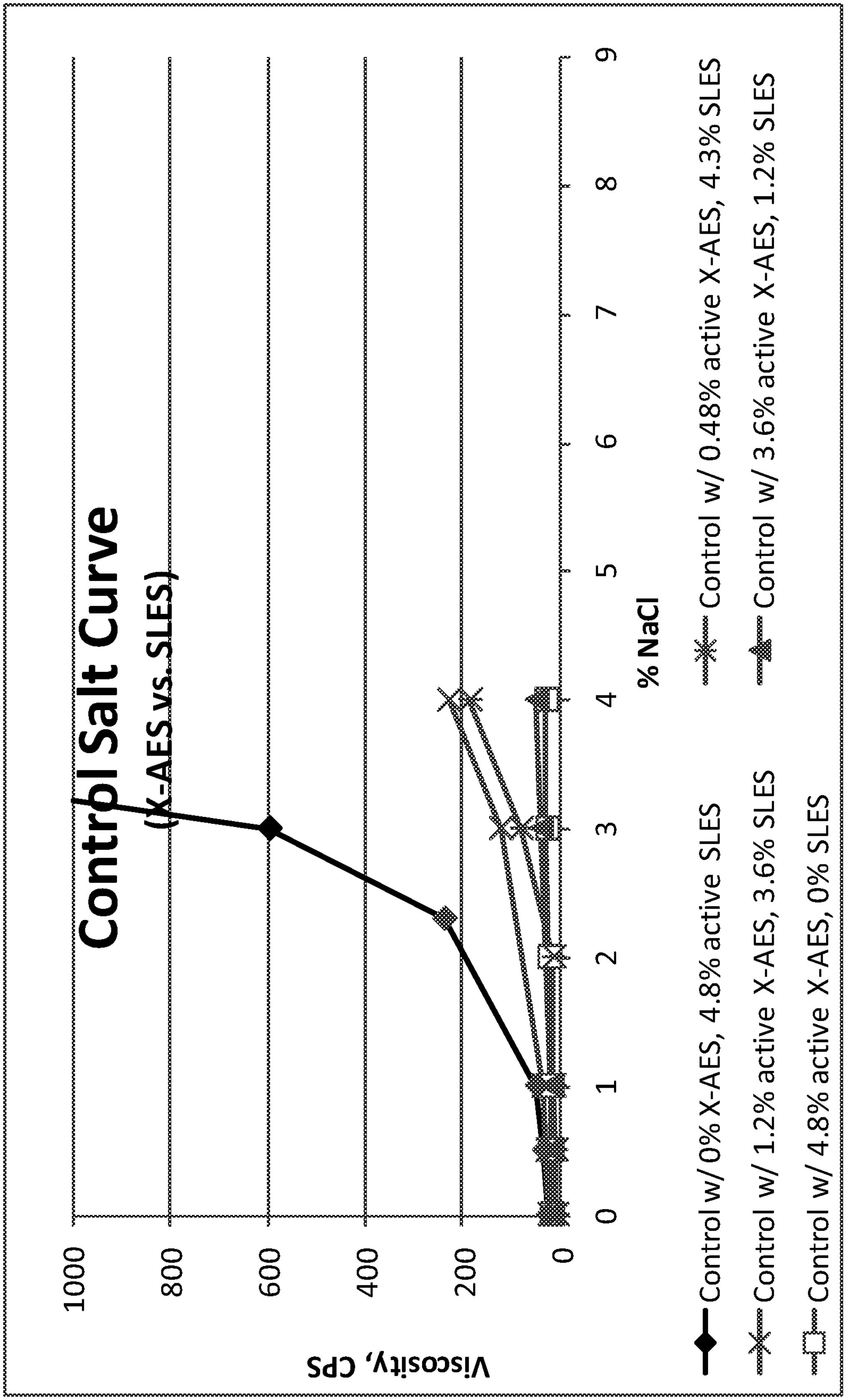
FIG. 8 is a salt curve graph comparing a traditional pot and pan soaking composition with SLES, compared to compositions with partial SLES (as low as 1/10 of the SLES preplaced) and total SLES replacement with X-AES with the viscosity depicted lower intervals.
Figure 9:
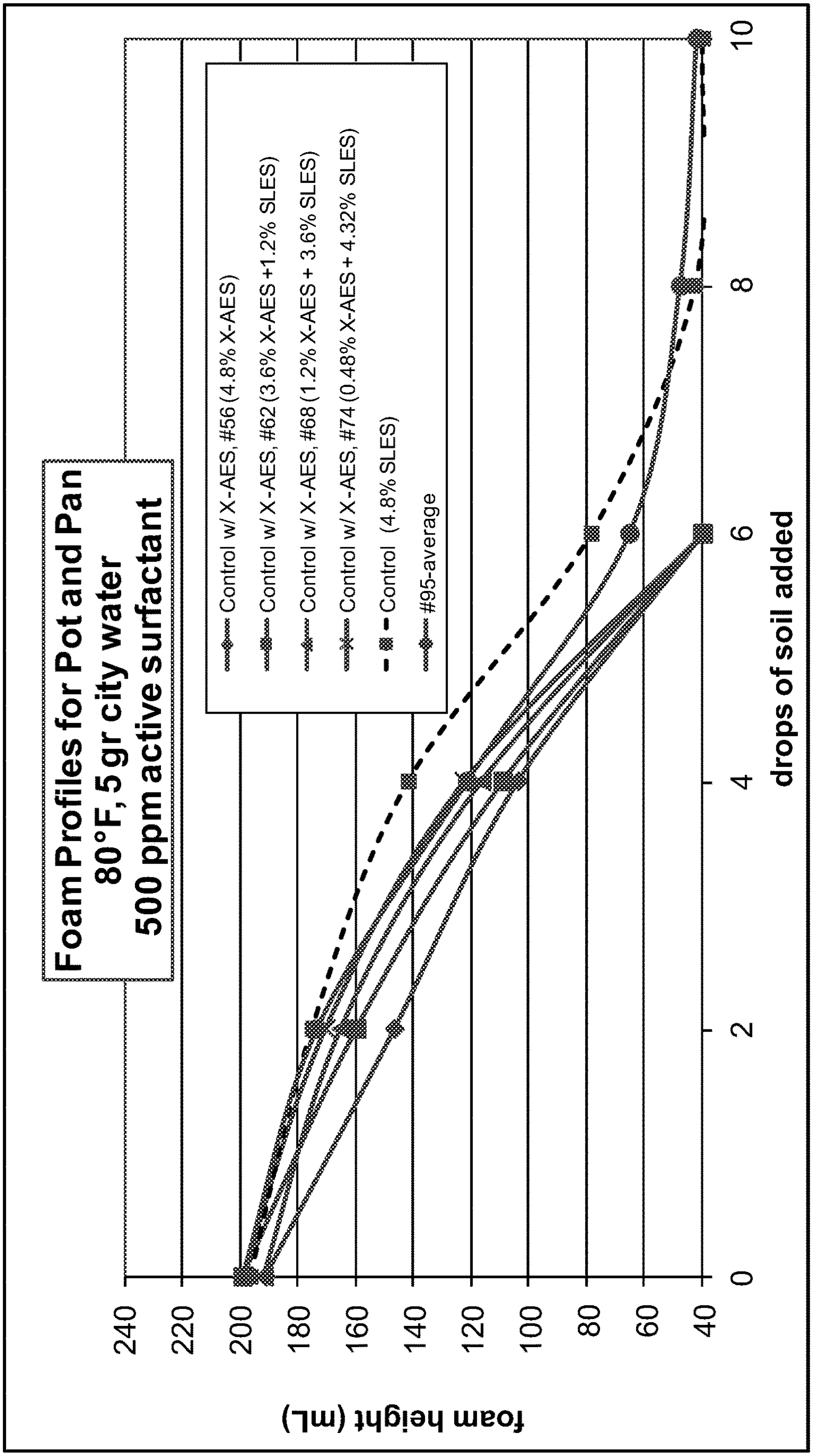
FIG. 9 is a graph showing the foam profile graph comparing a traditional pot and pan soaking composition with SLES, compared to compositions with partial SLES and total SLES replacement with X-AES. One can see that replacement with X-AES does not significantly impact foam height.
Figure 10:
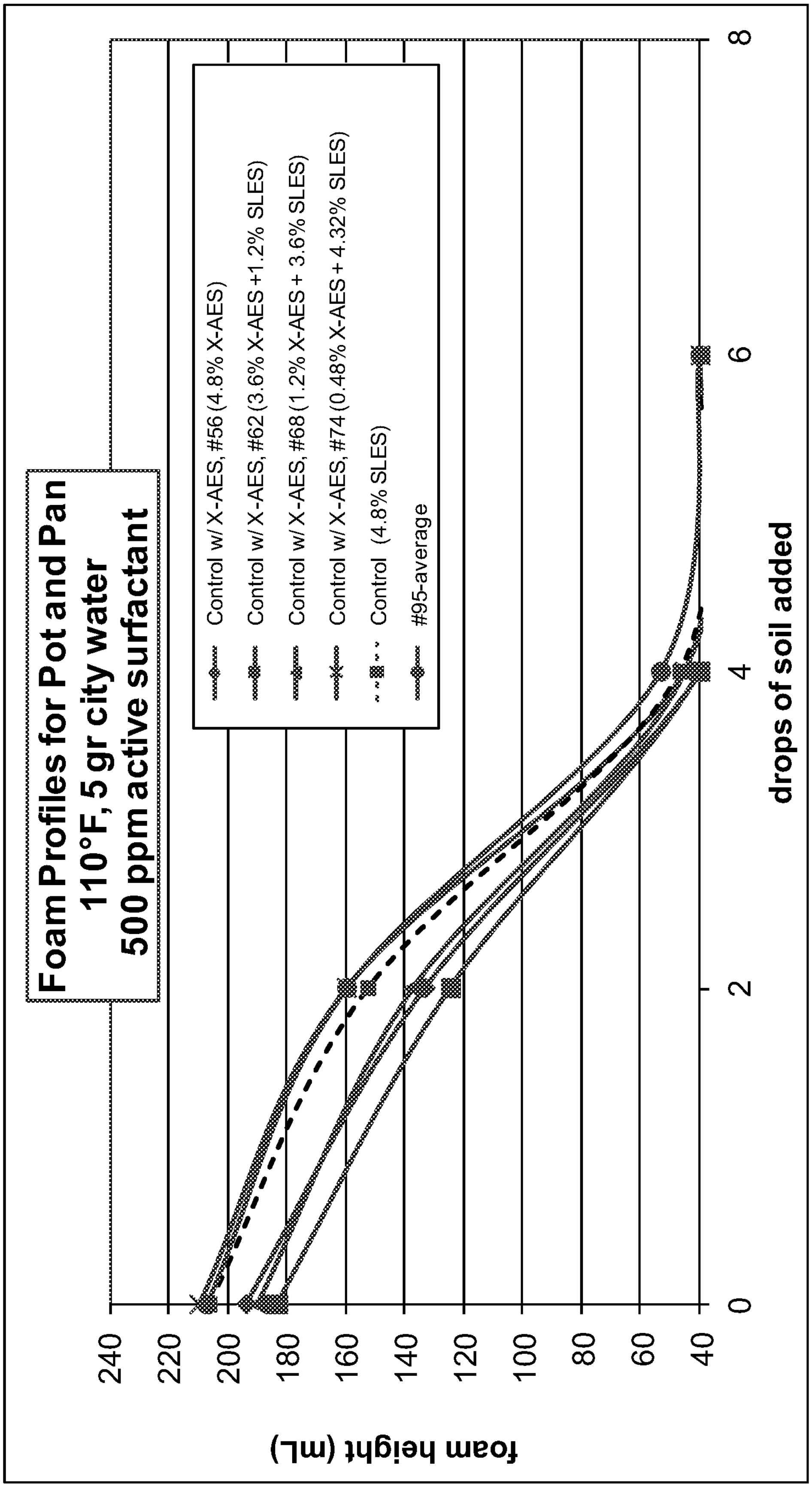
FIG. 10 is a graph showing the foam profile graph comparing a traditional pot and pan soaking composition with SLES, compared to compositions with partial SLES and total SLES replacement with X-AES. One can see that replacement with X-AES does not significantly impact foam height at higher temperatures.
Figure 11:
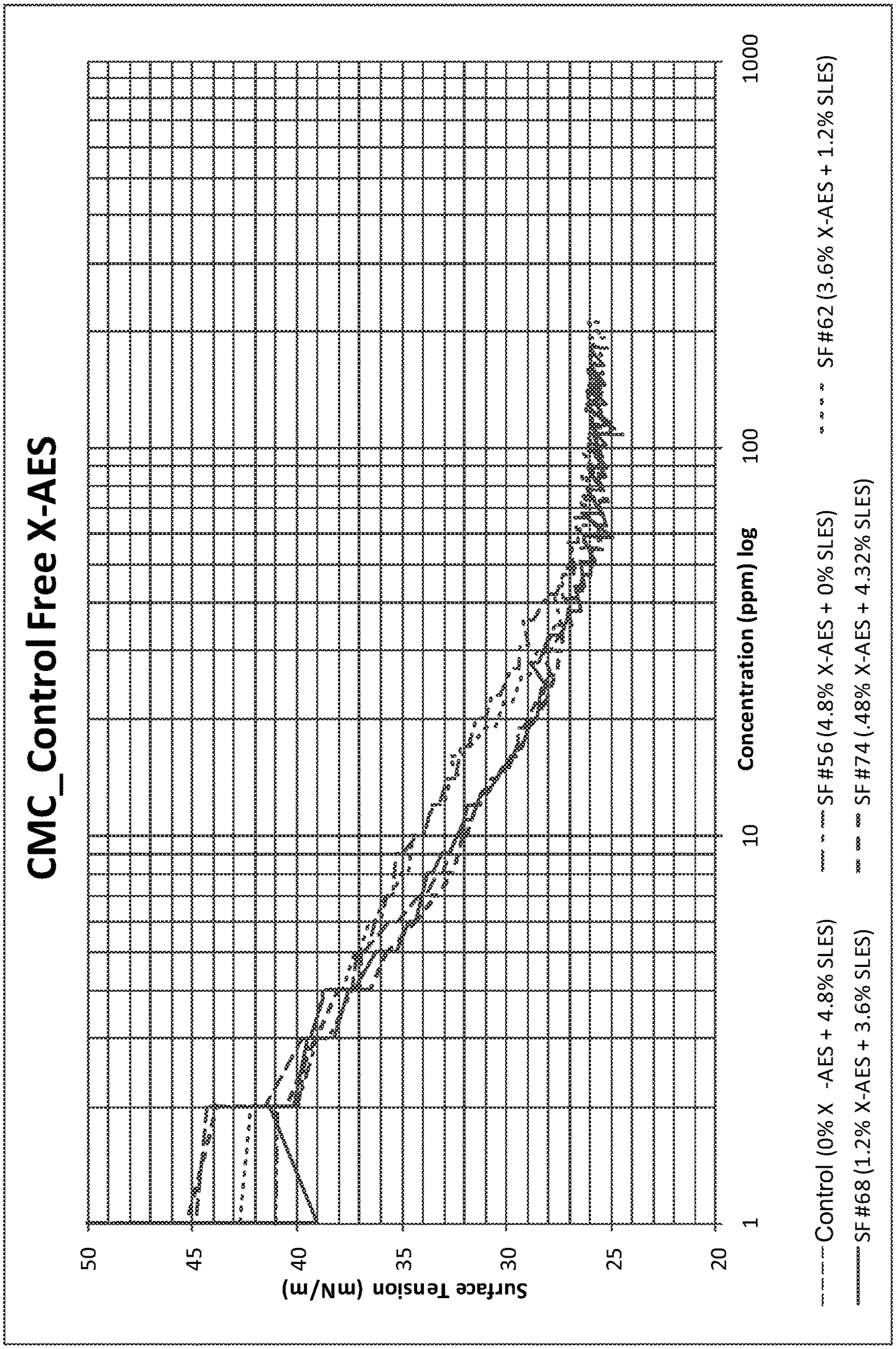
FIG. 11 is a graph showing surface tension over concentration comparing a traditional pot and pan soaking composition with SLES, to compositions with partial SLES and total SLES replacement with X-AES.
Figure 12:
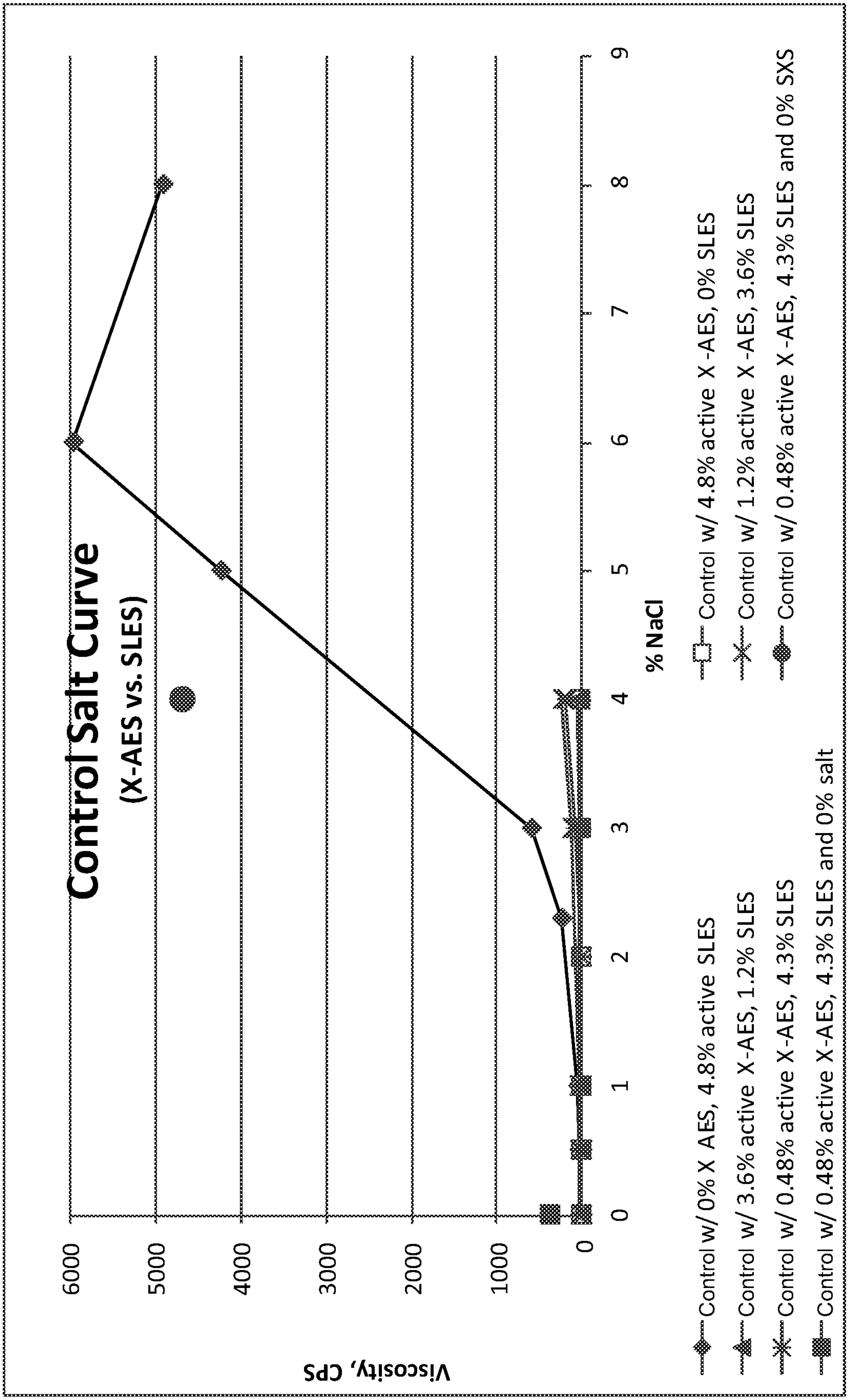
FIG. 12 is a salt curve graph comparing a traditional pot and pan soaking composition with SLES, compared to super concentration (almost double the actives) compositions with partial SLES and total SLES replacement with X-AES.

As can be seen from the results below (Table 4, and FIGS. 7 and 8), as little as 1/10 replacement of the LES in the composition results in very effective flattening of the salt curve.

TABLE 4

| Control CocoDEA free | % active surfactant | | Control | Control w/ X-AES #70 | Control w/ X-AES #71 | Control w/ X-AES #72 | Control w/ X-AES #73 | Control w/ X-AES #74 | Control w/ X-AES #75 | Control w/ X-AES #75-2 |
|---|---|---|---|---|---|---|---|---|---|---|
| Water Zeolite Softened | | 100016 | 47.60 | 48.70 | 48.20 | 47.70 | 46.70 | 45.70 | 44.70 | 44.70 |
| Sodium Chloride | | 142059 | 2.30 | 0.00 | 0.50 | 1.00 | 2.00 | 3.00 | 4.00 | 4.00 |
| Sodium Xylene Sulfonate 40% | | 171371 | 3.50 | 3.50 | 3.50 | 3.50 | 3.50 | 3.50 | 3.50 | 3.50 |
| PEI Ethoxylate | 80 | 290787 | 0.50 | 0.50 | 0.50 | 0.50 | 0.50 | 0.50 | 0.50 | 0.50 |
| Sodium C14-16 Olefin Sulfonate (40%) | 40 | 171318 | 22.50 | 22.50 | 22.50 | 22.50 | 22.50 | 23.37 | 22.50 | 22.50 |

TABLE 4-continued

| Control CocoDEA free | % active surfactant | | Control | Control w/ X-AES #70 | Control w/ X-AES #71 | Control w/ X-AES #72 | Control w/ X-AES #73 | Control w/ X-AES #74 | Control w/ X-AES #75 | Control w/ X-AES #75-2 |
|---|---|---|---|---|---|---|---|---|---|---|
| Sodium Laur Ether Ethox Sulfat 60% | 60 | 171405 | 8.00 | 7.20 | 7.20 | 7.20 | 7.20 | 7.20 | 7.20 | 7.20 |
| X-AES, 24% | 24 | | | 2.00 | 2.00 | 2.00 | 2.00 | 2.00 | 2.00 | 2.00 |
| Lauryl Dimethylamine Oxide 30% | 30 | 172452 | 15.60 | 15.60 | 15.60 | 15.60 | 15.60 | 15.60 | 15.60 | 15.60 |
| TOTAL: | | | 100.00 | 100.00 | 100.00 | 100.00 | 100.00 | 100.87 | 100.00 | 100.00 |
| % active SLES | | | 4.8 | 4.32 | 4.32 | 4.32 | 4.32 | 4.32 | 4.32 | 4.32 |
| % active X-AES | | | 0 | 0.48 | 0.48 | 0.48 | 0.48 | 0.48 | 0.48 | 0.48 |
| Total % active SLES + X-AES | | | 4.8 | 4.8 | 4.8 | 4.8 | 4.8 | 4.8 | 4.8 | 4.8 |
| Total % active surfactant | | | 18.88 | 18.88 | 18.88 | 18.88 | 18.88 | 19.228 | 18.88 | 18.88 |
| Viscosity, spdl 3, 50 rpm, cps, 74° F. | | | 238.3 | 7.2 | 9.6 | 13.6 | 13.6 | 80 | 185.6 | 222.4 |
| Foam Height, mls, 80° F. | | | 433 | | | | | 373 | | |
| Foam Height, mls, 110° F. | | | 286 | | | | | 295 | | |
| Appearance | | | | clear sol'n | clear sol'n | clear sol'n | clear sol'n | clear sol'n | clear sol'n | clear sol'n |

(IV) Foam and CMC are Virtually Unaffected (VII) Super-Concentrates

The following data show that the use of extended surfactant makes concentrating a pot-n-pan formula further easier. For example, a "super-concentrate" of almost double the active surfactants has a viscosity of 384 cps, which is very manageable.

TABLE 5

| Control CocoDEA free | % active surfactant | | Control | Jul. 31, 2013 Control w/ X-AES #75 | Jul. 31, 2013 Control w/ X-AES #75-2 | Aug. 27, 2013 Control w/ X-AES #76 | Aug. 27, 2013 Control w/ X-AES #77, concentrate | Aug. 27, 2013 Control w/ X-AES #78, concentrate | Aug. 29, 2013 Control w/ X-AES #79, concentrate | Aug. 29, 2013 Control w/ X-AES #80, concentrate |
|---|---|---|---|---|---|---|---|---|---|---|
| Water Zeolite Softened | | 100016 | 47.60 | 44.70 | 44.7 | 48.2 | | | | |
| Sodium Chloride | | 142059 | 2.30 | 4.00 | 4 | 4 | 7.23 | | | |
| Sodium Xylene Sulfonate 40% | | 171371 | 3.50 | 3.50 | 3.5 | | 6.33 | 6.82 | 13.56 | 9.00 |
| PEI Ethoxylate | 80 | 200787 | 0.50 | 0.50 | 0.5 | 0.5 | 0.90 | 0.97 | 0.90 | 0.95 |
| Sodium C14-16 Olefin Sulfonate (40%) | 40 | 171318 | 22.50 | 22.50 | 22.5 | 22.5 | 40.69 | 43.84 | 40.69 | 42.80 |
| Sodium Laur Ether Ethox Sulfat 80% | 60 | 171405 | 8.00 | 7.20 | 7.2 | 7.2 | 13.02 | 14.03 | 13.02 | 13.70 |
| X-AES, 24% | 24 | | | 2.00 | 2 | 2 | 3.62 | 3.94 | 3.62 | 3.80 |
| Lauryl Dimethylamine Oxide 30% | 30 | 172452 | 15.60 | 15.60 | 15.6 | 15.6 | 28.21 | 30.40 | 28.21 | 29.70 |
| TOTAL: | | | 100.00 | 100.00 | 100.00 | 100.00 | 100.00 | 100.00 | 100.00 | 99.95 |
| % actve SLES | | | 4.8 | 4.32 | 4.32 | 4.32 | 7.81 | 8.42 | 7.81 | 8.22 |
| % active X-AES | | | 0 | 0.48 | 0.48 | 0.48 | 0.87 | 0.95 | 0.87 | 0.91 |
| Total % active SLES + X-AES | | | 4.8 | 4.80 | 4.80 | 4.80 | 8.68 | 9.36 | 8.68 | 9.13 |
| Total % active surfactant | | | 18.88 | 18.88 | 18.88 | 18.88 | 34.14 | 36.80 | 34.14 | 35.92 |
| Viscosity, spdl 3, 50 rpm, cps, 74° F. | | | 238.3 | 185.6 | 222.4 | | | | 384* | |
| Viscosity, spdl 6, 50 rpm, cps, 74° F. | | | | | | 4700 | | | | |
| Viscosity, spdl 5, 50 rpm, cps, 74° F. | | | | | | 4864 | 1700 | | | |
| | | | | | | | | | *aerated | |
| Foam Height, mls, 80° F. | | | | 433 | | | | | | |
| Foam Height, mls, 110° F. | | | | 286 | | | | | | |
| Appearance | | | | clear sol'n | clear sol'n | v. thick clear soln, one phase | thick turbid soln, one phase | gelled goo | flowable turbid liquid | opaque flowable thick paste |

The invention claimed is:

1. A laundry cleaning composition comprising:

a positively charged polymer;

an anionic surfactant comprising an extended chain anionic surfactant having the formula:

$$R\text{-}[L]_x\text{-}[O{-}CH_2{-}CH_2]_y\text{-}M$$

where R is a linear or branched, saturated or unsaturated, substituted or unsubstituted, aliphatic or aromatic hydrocarbon radical having from about 6 to 20 carbon atoms, L is a poly-propylene oxide linking group, M is an ionic species of one or more of a carboxylate, a sulfonate, a sulfate, and/or a phosphate, x is the chain length of the linking group ranging from 2-16, and y is the average degree of ethoxylation ranging from 1 to 5; and a carrier, wherein said composition has less than 0.5 wt. % cocamide DEA.

2. The cleaning composition of claim 1, wherein said positively charged polymer is present in an amount of from about 1 wt. % to about 5 wt. % and is selected from the group consisting of: polyamines, polyquats, polyglycerol quats, ethoxylated PEI, propoxylated PEI, or a mixture of PEI and glycol, or PEI with PO-blocked EO units added to the PEI/glycol mixture.

3. The cleaning composition of claim 1, wherein said anionic surfactant is present in an amount of from about 0.1 wt. % to about 75 wt. %.

4. The cleaning composition of claim 1, wherein said composition comprises one or more additional anionic surfactants in an amount of from about 1 wt. % to about 75 wt. %.

5. The cleaning composition of claim 4, wherein said additional anionic surfactant comprises one or more of sodium $C_{14}$-$C_{16}$ olefin sulfonate or sodium lauryl ether ethoxy sulfate.

6. The cleaning composition of claim 1, wherein said composition further comprises a nonionic surfactant in an amount of from about 0.01 wt. % to about 20 wt. %.

7. The cleaning composition of claim 6, wherein said nonionic surfactant comprises lauryl dimethylamine oxide.

8. The cleaning composition of claim 1, wherein said carrier is present in an amount of from about 20 wt. % to about 80 wt. %.

9. The cleaning composition of claim 1, wherein said composition further comprises a hydrotrope in an amount between about 0.01 wt. % and about 20 wt. %.

10. The cleaning composition of claim 1, wherein said composition does not include an enzyme.

11. The cleaning composition of claim 1, wherein said composition does not include an alcohol alkoxylate.

12. A method of removing soils from laundry, the method comprising:

applying to soiled laundry a laundry cleaning composition comprising a positively charged polymer, a carrier, and an anionic surfactant comprising an extended chain anionic surfactant having the formula:

$$R\text{-}[L]_x\text{-}[O{-}CH_2{-}CH_2]_y\text{-}M$$

where R is a linear or branched, saturated or unsaturated, substituted or unsubstituted, aliphatic or aromatic hydrocarbon radical having from about 6 to 20 carbon atoms, L is a poly-propylene oxide linking group, M is an ionic species of one or more of a carboxylate, a sulfonate, a sulfate, and/or a phosphate, x is the chain length of the linking group ranging from 2-16, and y is the average degree of ethoxylation ranging from 1 to 5; and thereafter rinsing the laundry.

13. The method of claim 12, wherein said laundry cleaning composition further comprises an additional anionic surfactant including one or more of sodium C14-C16 olefin sulfonate or sodium lauryl ether ethoxy sulfate.

14. The method of claim 13, wherein said additional anionic surfactant is present in an amount of from about 5 wt. % to about 65 wt. %.

15. The method of claim 12, wherein said positively charged polymer is a PEI polymer present in an amount of from about 1 wt. % to about 5 wt. %.

16. The method of claim 12, wherein said carrier is present in an amount of from about 20 wt. % to about 80 wt. %.

17. The method of claim 12, wherein said laundry cleaning composition further comprises a hydrotrope in an amount between about 0.01 wt. % and about 20 wt. %.

18. The method of claim 12, wherein said laundry cleaning composition is diluted with water to provide a use solution before applying to the soiled laundry.

19. The method of claim 12, wherein said laundry cleaning composition forms an emulsion with soils present on said laundry.

20. The method of claim 13, wherein said laundry cleaning composition does not include an alcohol alkoxylate.

* * * * *